United States Patent
D'Haenens et al.

(10) Patent No.: US 11,538,092 B2
(45) Date of Patent: Dec. 27, 2022

(54) DIGITAL CART MONITORING AND VALIDATION USING INTERPROCESS COMMUNICATION

(71) Applicant: 7-ELEVEN, INC., Irving, TX (US)

(72) Inventors: Dieter Roger Werner Joeri D'Haenens, Dallas, TX (US); Tarang S. Sethia, Frisco, TX (US); Nishanth Mandaara, The Colony, TX (US); Raja Sekhar Chiderae, Irving, TX (US); Sommer Slattery Blucas, Roanoke, TX (US); Deviprasad Mulluru, Flower Mound, TX (US)

(73) Assignee: 7-ELEVEN, INC., Irving, TX (US)

( * ) Notice: Subject to any disclaimer, the term of this patent is extended or adjusted under 35 U.S.C. 154(b) by 291 days.

(21) Appl. No.: 16/871,562

(22) Filed: May 11, 2020

(65) Prior Publication Data
US 2021/0350446 A1  Nov. 11, 2021

(51) Int. Cl.
*G06Q 30/06* (2012.01)
*G06K 7/14* (2006.01)
(Continued)

(52) U.S. Cl.
CPC ....... *G06Q 30/0637* (2013.01); *G06K 7/1413* (2013.01); *G06Q 20/203* (2013.01);
(Continued)

(58) Field of Classification Search
CPC ............. G06Q 30/0637; G06Q 20/203; G06Q 20/206; G06Q 20/208; G06Q 20/4014;
(Continued)

(56) References Cited

U.S. PATENT DOCUMENTS

2011/0210168 A1* 9/2011 Haibara ............... G07G 1/0054
235/375
2013/0325718 A1* 12/2013 Khan .................. G06Q 20/3274
705/44
(Continued)

OTHER PUBLICATIONS

Patent Cooperation Treaty, International Search Report and Written Opinion, International Application No. PCT/US2021/030046, dated Aug. 27, 2021, 28 pages.

*Primary Examiner* — Florian M Zeender
*Assistant Examiner* — Nicole Elena Bruner
(74) *Attorney, Agent, or Firm* — Baker Botts, LLP

(57) ABSTRACT

A system includes a server and merchant device. The server receives product information for a product scanned by a mobile device. The server stores the product information for the product in a digital cart. The server receives a transaction request from the mobile device, determines that the product is associated with a validation requirement, and transmits a validation request to the merchant device. The server receives, from the merchant device, an indication that the validation requirement is satisfied, processes a transaction, and transmits, to the merchant device, an indication that the transaction is complete. The merchant device receives the validation request, determines that the validation requirement is satisfied, and transmits the indication that the validation requirement is satisfied to the server. The merchant device receives, from the server, the indication that the transaction is complete and displays the indication that the transaction on the display.

18 Claims, 15 Drawing Sheets

(51) Int. Cl.
*G06Q 20/20* (2012.01)
*G06Q 20/40* (2012.01)
*G06Q 30/00* (2012.01)
*G06Q 50/26* (2012.01)

(52) U.S. Cl.
CPC ......... *G06Q 20/206* (2013.01); *G06Q 20/208* (2013.01); *G06Q 20/4014* (2013.01); *G06Q 30/0185* (2013.01); *G06Q 30/0607* (2013.01); *G06Q 30/0639* (2013.01); *G06Q 50/265* (2013.01)

(58) Field of Classification Search
CPC ........... G06Q 30/0185; G06Q 30/0607; G06Q 30/0639; G06Q 50/265; G06Q 30/0601; G06Q 20/322; G06Q 20/3224; G06Q 20/326; G06Q 20/3276; G06Q 20/401; G06K 7/1413; G07F 9/001; G07G 1/0045
See application file for complete search history.

(56) References Cited

U.S. PATENT DOCUMENTS

| | | | |
|---|---|---|---|
| 2016/0012399 A1* | 1/2016 | Etchegoyen | G06Q 20/1085 705/76 |
| 2016/0012465 A1* | 1/2016 | Sharp | G06Q 20/321 705/14.17 |
| 2019/0050921 A1* | 2/2019 | Ryner | G06Q 20/3224 |
| 2019/0205961 A1* | 7/2019 | Baren | G06Q 20/12 |
| 2019/0259014 A1* | 8/2019 | Katayama | G06F 3/14 |
| 2019/0311417 A1* | 10/2019 | Randisi | G06Q 50/30 |
| 2020/0134598 A1 | 4/2020 | Mandaara et al. | |

* cited by examiner

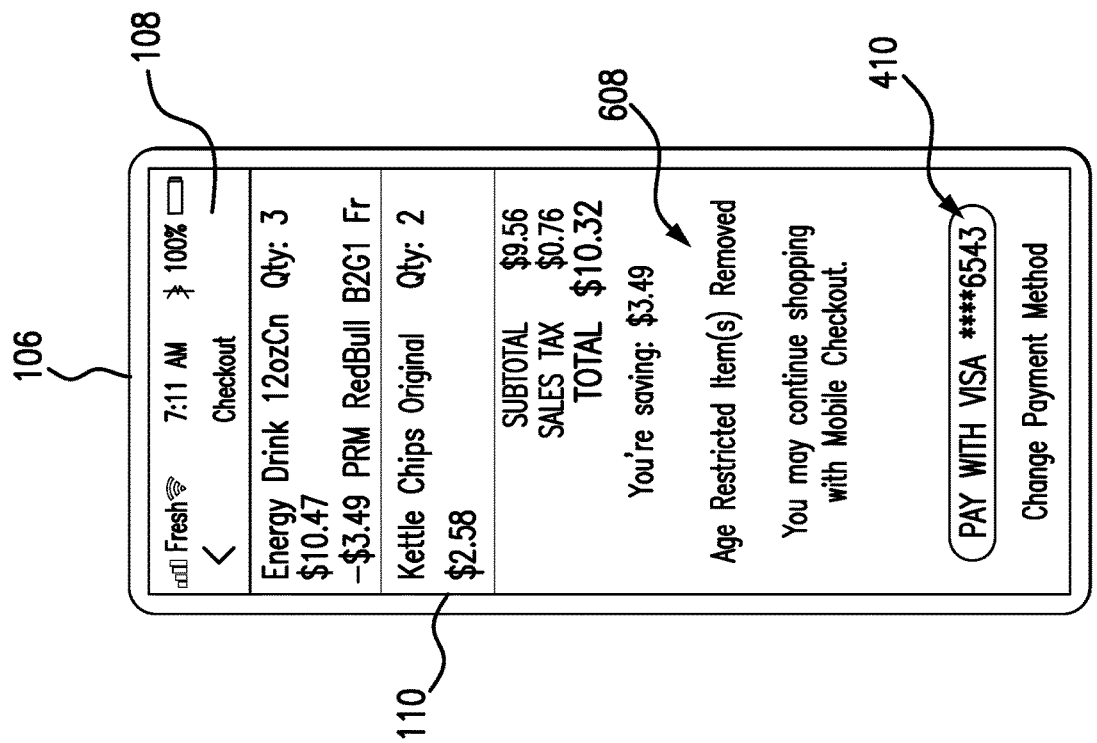
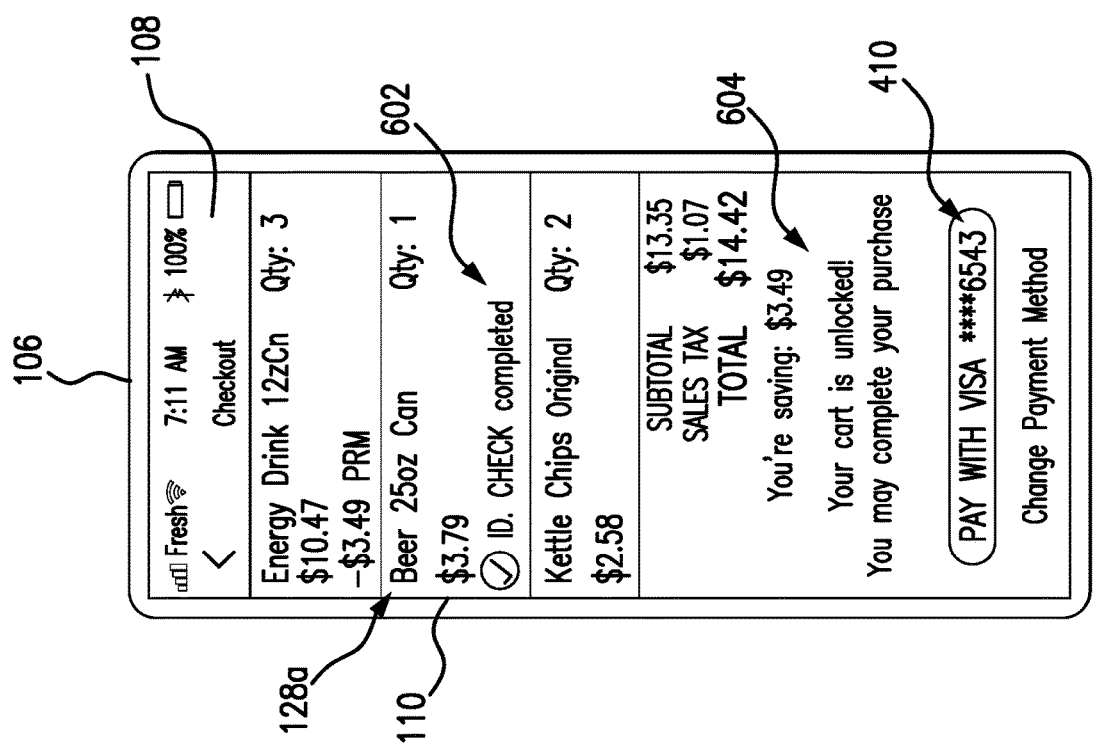

DIGITAL CART MONITORING AND VALIDATION USING INTERPROCESS COMMUNICATION

TECHNICAL FIELD

The present disclosure relates generally to interprocess communications, and more specifically to digital cart monitoring and validation using interprocess communication.

BACKGROUND

Mobile devices (e.g., smart phones) allow users to access data content and services from anywhere in the world. This mobility allows users to perform operations such as streaming media or making purchases from home, work, or anywhere else without being tied to a particular location. This mobility poses several technical challenges owing to the fact that the operations performed on a mobile device are not inherently linked with where the mobile device is located. In other words, there is no correlation between operations performed on a mobile device and the location of the mobile device. Another example of a technical challenge posed by the mobility of mobile devices is that they are typically not configured to automatically communicate and/or cooperate with other devices or systems where the mobile device is located. Enabling such communication/cooperation poses several challenges. As an example, care should be taken to selectively enable communication between the mobile device and one or more other devices/systems where the mobile device is located, rather than enabling communication between the mobile device and all available devices. As another example, where multiple devices cooperate to execute a task, effort should be taken to ensure that each device performs its portion of the task at the proper time and in the proper order. Accordingly, it is desirable to provide a solution that allows mobile devices to be used cooperatively and efficiently with other devices to perform tasks where the mobile device is located.

SUMMARY

This disclosure contemplates a validation system designed to address one or more of the above technical problems. The validation system uses interprocess communication between a mobile device, a merchant device, and a cloud server to enable the mobile device, the merchant device, and the cloud server to cooperatively perform a task. In particular, the mobile device, merchant device, and cloud server are configured to cooperatively monitor, process, and validate a transaction initiated by the mobile device. The cloud server is configured to determine when a mobile device seeking to engage in a mobile self-checkout process is located within a physical store, and then to facilitate communication between itself, the mobile device, and one or more merchant devices located within the physical store.

During the mobile self-checkout process, a customer uses the mobile device to scan products that he/she wishes to purchase. The mobile device communicates information about these products to the cloud server, which then adds the products to a digital cart. Each time a product is added to the digital cart, the cloud server communicates this information to the merchant device, enabling a merchant in possession of the merchant device to monitor, in real time, the mobile self-checkout session conducted by the customer. The cloud server also determines whether any of the products that have been added to the digital cart are associated with a validation requirement, such that the customer should not be permitted to purchase the product(s) unless the validation requirement is satisfied. Example validation requirements include a random or algorithm-based bag check, to ensure that the products in a customer's physical possession match those the customer added to his/her digital cart, an age verification requirement, to ensure that the customer is of legal age to purchase an age restricted product, an availability requirement, to ensure that the product is currently available for the customer to purchase, and/or any other suitable requirements. If any of the products are associated with a validation requirement, the cloud server instructs the mobile device to prevent the customer from completing a transaction for the products (e.g., the cloud server instructs the mobile device to disable a payment button used to submit payment for the products). The cloud server then transmits a validation request to the merchant device, instructing the merchant device to evaluate each of the validation requirements. The merchant device evaluates each of the validation requirements and communicates the results to the cloud server. If any of the validation requirements are not satisfied, the cloud server removes the product(s) associated with the failed validation requirement(s) from the digital cart. The cloud server then transmits an updated digital cart to the mobile device, and instructs the mobile device to enable the customer to complete a transaction for the products in the updated digital cart. The mobile device may then transmit a transaction request for the products in the updated digital cart to the cloud server. The cloud server then processes the transaction and transmits confirmation information to both the mobile device and the merchant device, indicating that the transaction was successful. Certain embodiments of the validation system are described below.

According to one embodiment, a system includes a server and a merchant device in signal communication with the server. The server includes a first hardware processor. The first hardware processor receives product information for a first product scanned by a mobile device. The mobile device is associated with a user account. In response to receiving the product information for the first product, the first processor transmits an identification of the user account to a merchant device. The first processor also stores the product information for the first product in a digital cart. The digital cart includes product information for one or more products scanned by the mobile device. The first processor additionally receives a transaction request from the mobile device for the one or more products scanned by the mobile device. In response to receiving the transaction request, the first processor determines that the first product is associated with a validation requirement. In response to determining that the first product is associated with the validation requirement, the first processor transmits a validation request to the merchant device. The validation request is associated with the validation requirement. The first processor further receives, from the merchant device, an indication that the validation requirement is satisfied. In response to receiving the indication that the validation requirement is satisfied, the first processor processes a transaction for the one or more products, based on the product information for the one or more products stored in the digital cart. In response to processing the transaction, the first processor transmits, to the merchant device, an indication that the transaction is complete. The merchant device includes a display and a second hardware processor. The second hardware processor receives, from the server, the identification of the user account. The second processor also displays the identification of the user account on the display. The second processor additionally receives, from the server, the validation request. In response to receiving the validation request, the second processor determines that the validation requirement is satisfied. The second processor further transmits the indication that the validation requirement is satisfied to the server. The second processor also receives, from the server, the indication that the transaction is complete. In response to receiving the indication that the transaction is complete, the second processor displays the indication that the transaction is complete on the display.

According to another embodiment, a method includes receiving product information for a first product scanned by a mobile device. The mobile device is associated with a user account. In response to receiving the product information for the first product, the method includes transmitting an identification of the user account to a merchant device. The method also includes storing the product information for the first product in a digital cart. The digital cart includes product information for one or more products scanned by the mobile device. The method additionally includes receiving, by the merchant device, the identification of the user account. The method further includes displaying, by the merchant device, the identification of the user account on a display. The method also includes receiving a transaction request from the mobile device for the one or more products scanned by the mobile device. In response to receiving the transaction request, the method includes determining that the first product is associated with a validation requirement. In response to determining that the first product is associated with the validation requirement, the method includes transmitting a validation request to the merchant device. The validation request is associated with the validation requirement. In response to transmitting the validation request to the merchant device, the method includes receiving, by the merchant device, the validation request. The method additionally includes determining, by the merchant device, that the validation requirement is satisfied. The method further includes transmitting, by the merchant device, an indication that the validation requirement is satisfied. In response to transmitting, by the merchant device, the indication that the validation requirement is satisfied, the method includes receiving the indication that the validation requirement is satisfied. The method also includes processing a transaction for the one or more products, based on the product information for the one or more products stored in the digital cart. In response to processing the transaction, the method includes transmitting, to the merchant device, an indication that the transaction is complete. The method additionally includes receiving, by the merchant device, the indication that the transaction is complete. In response to receiving the indication that the transaction is complete, the method includes displaying, by the merchant device, the indication that the transaction is complete on the display.

According to a further embodiment, a non-transitory computer-readable medium includes instructions that are configured, when executed by a hardware processor, to receive product information for a first product scanned by a mobile device. The mobile device is associated with a user account. In response to receiving the product information for the first product, the instructions are also configured, when executed by the hardware processor, to transmit an identification of the user account to a merchant device. The merchant device is configured to receive the identification of the user account. The merchant device is also configured to display the identification of the user account on a display. The merchant device is further configured to store the product information for the first product in a digital cart comprising product information for one or more products scanned by the mobile device. The instructions are additionally configured, when executed by the hardware processor, to receive a transaction request from the mobile device for the one or more products scanned by the mobile device. In response to receiving the transaction request, the instructions are configured, when executed by the hardware processor, to determine that the first product is associated with a validation requirement. In response to determining that the first product is associated with the validation requirement, the instructions are configured, when executed by the hardware processor, to transmit a validation request to the merchant device. The validation request is associated with the validation requirement. The merchant device is further configured receive the validation request. In response to receiving the validation request, the merchant device is configured to determine that the validation requirement is satisfied and to transmit the indication that the validation requirement is satisfied. The instructions are further configured, when executed by the hardware processor, to receive, from the merchant device, an indication that the validation requirement is satisfied. In response to receiving the indication that the validation requirement is satisfied, the instructions are configured, when executed by the hardware processor, to process a transaction for the one or more products, based on the product information for the one or more products stored in the digital cart. In response to processing the transaction, the instructions are configured, when executed by the hardware processor, to transmit, to the merchant device, an indication that the transaction is complete. The merchant device is further configured to receive the indication that the transaction is complete. In response to receiving the indication that the transaction is complete, the merchant device is also configured to display the indication that the transaction is complete on the display.

Certain embodiments provide one or more technical advantages. As an example, an embodiment enables mobile devices to work cooperatively with other devices, by enabling communication between a mobile device and other devices located at the same physical location as the mobile device. As another example, an embodiment enables multiple devices to cooperatively validate operations performed by a mobile device at a given location. As a further example, an embodiment prevents a mobile device from completing a transaction before validation requirements associated with the transaction have been evaluated, by locking the device to prevent it from submitting a request to complete the transaction. The system described in this disclosure may particularly be integrated into a mobile self-checkout system for use in a physical store. In particular, a customer may use an application installed on his/her mobile device to add products to a digital shopping cart. A merchant may view, in real time, the products that the customer has added to his/her digital cart using the merchant device. In this manner, the merchant may determine whether or not the customer needs assistance in adding products to his/her digital cart. When the customer adds a product associated with a validation requirement (e.g., an age restricted product) to his/her digital cart, the merchant may receive an alert on the merchant device. The merchant may then use the merchant device to evaluate the validation requirement (e.g., the merchant may view the customer's ID and enter the customer's birth date into the merchant device). Until the validation requirement has been satisfied, the application installed on the customer's mobile device prevents the customer from submitting payment for the products he/she has added to his/her digital cart. If any of the validation requirements are not satisfied, the products associated with the failed validation requirements are removed from the customer's digital cart. Once all of the validation requirements have been evaluated, the mobile application installed on the customer's mobile device allows the customer to submit payment for the products in his/her digital cart. In this manner, a customer may complete a transaction for products selected in a physical store, without using a traditional point-of-sale terminal (e.g., a cash register).

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 6A and 6B present example screenshots from a mobile device of the example validation system of FIG. 1, after a merchant device has determined whether a validation requirement associated with a product that a customer using the mobile device added to his/her digital shopping cart is satisfied;

DETAILED DESCRIPTION

Embodiments of the present disclosure and its advantages may be understood by referring to FIGS. 1 through 9 of the drawings, like numerals being used for like and corresponding parts of the various drawings.

I. System Overview

Figure 1:
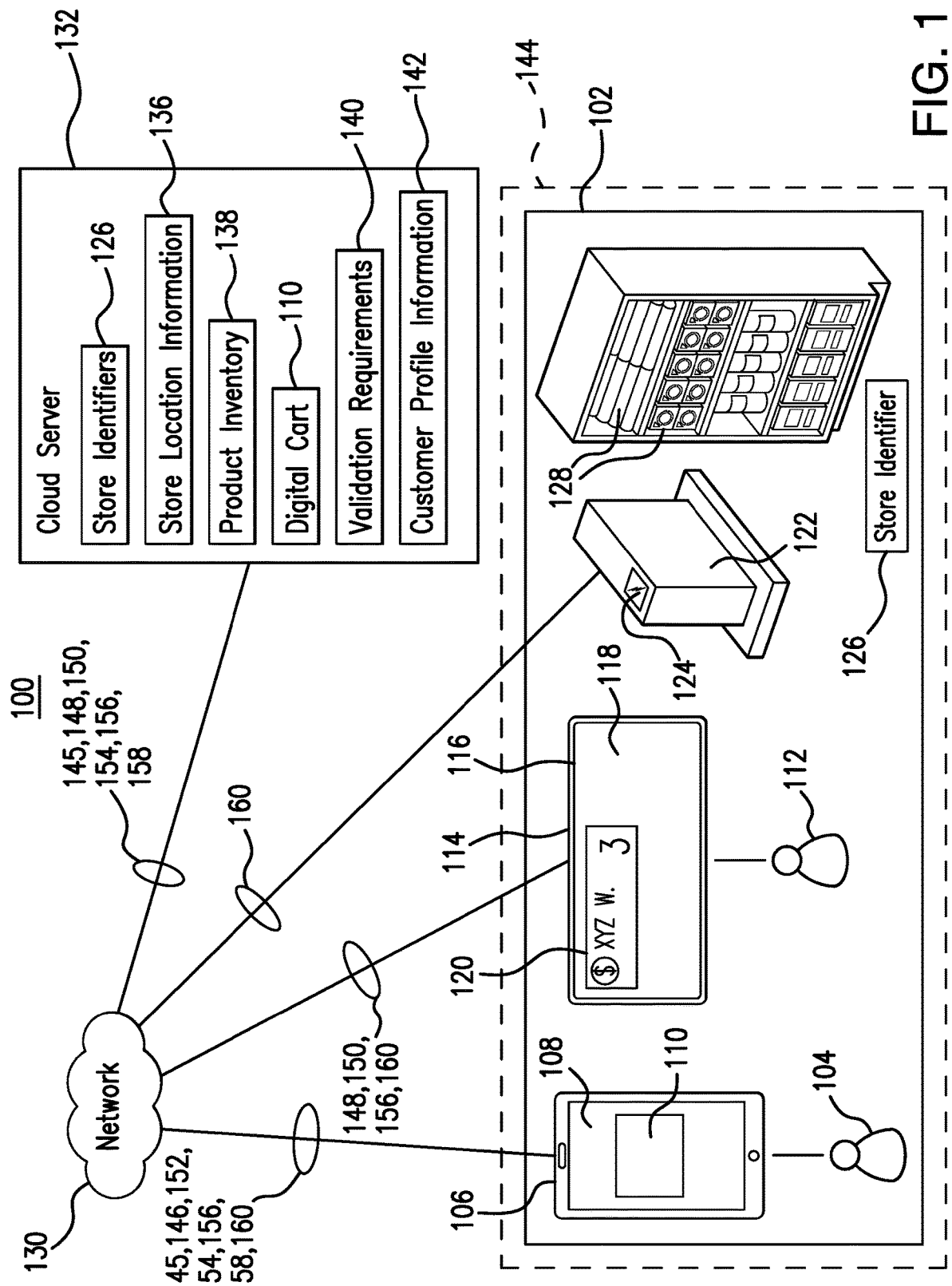
FIG. 1 illustrates an example validation system 100.

FIG. 1 illustrates an example validation system 100 that includes customer(s) 104, mobile device(s) 106, merchant(s) 112, merchant device(s) 114, network 130, and cloud server 132. In certain embodiments, system 100 additionally includes one or more validation terminal(s) 122. Generally, mobile devices(s) 106, merchant device(s) 114, cloud server 132, and, in certain embodiments, validation terminal(s) 122 cooperate with one another to monitor, validate, and process a transaction initiated by customer 104 using his/her mobile device 106, while located in a physical location 102.

Customers 104 use mobile devices 106 to conduct transactions within physical location 102. In particular, customers 104 add products 128 that they would like to purchase to a digital shopping cart 110, using a mobile application 108 installed on their mobile device 106. For example, customers 104 may add products 128 that they would like to purchase to digital cart 110 by scanning product barcodes into application 108, using the camera on mobile device 106. The process by which a customer 104 adds products 128 to digital cart 110 is described in detail below, in the discussion of FIG. 2. Once customer 104 has finished adding products to digital cart 110, the customer may use his/her mobile device 106 to complete the transaction without using a traditional point-of-sale terminal (e.g., a cash register). For example, customer 104 may use the mobile application 108 installed on his/her mobile device 106 to submit payment for the products that he/she selected. The process by which customer 104 uses mobile device 106 to submit payment for the products in digital cart 110 is described in further detail below, in the discussion of FIGS. 6A and 6B. In certain embodiments, mobile device 106 may be blocked from submitting payment for the products 128 that customer 104 added to digital cart 110 until merchant device 114 has determined whether or not a validation requirement 140 associated with one or more of the products 128 has been satisfied, as described in further detail below, in the discussion of FIGS. 4A and 4B.

Mobile devices 106 include any appropriate mobile device for communicating with components of system 100 over network 130. For example, mobile devices 106 may be a telephone, a mobile phone, a laptop, a wireless or cellular telephone, a tablet, a server, an IoT device, and/or an automated assistant, among others. This disclosure contemplates mobile devices 106 being any appropriate device for sending and receiving communications over network 130. Device 106 may also include a user interface, such as a display, a microphone, keypad, or other appropriate terminal equipment usable by customer 104. In some embodiments, an application executed by a processor of mobile device 106 may perform the functions described herein.

Merchants 112 use merchant devices 114 to monitor and validate the products 128 that customers 104 add to their digital carts 110. For example, a merchant 112 may use an application 118, installed on merchant device 114, to monitor and validate the products 128 that customers 104 add to their digital carts 110. In particular, when a customer 104 enters physical location 102 and begins using his/her mobile device 106 to add products 128 to digital cart 110 and/or uses mobile device 106 to indicate that he/she would like to begin the mobile self-checkout process, merchant device 114 displays an identification 120 of customer 104 on display 116 of merchant device 114, as described in detail below, in the discussion of FIGS. 3A and 3B. Merchant device 112 may be configured to receive information about digital cart 110 and display this information on display 116 of merchant device 114. For example, each time customer 104 adds a product 128 to digital cart 110, merchant device 114 may receive information associated with the product, as stored in digital cart 110. For example, merchant device 114 may receive a description, a price, a quantity, and/or any other information associated with the product. Merchant device 114 may display such information on display 116, as described in further detail below, in the discussion of FIG. 3C.

In certain embodiments, merchant device 114 may receive a validation request 148 for a product 128 added by customer 104 to his/her digital cart 110. As an example, product 128 may be an age-restricted product (e.g., alcohol, cigarettes, etc.) and validation request 148 may be a request to ensure that customer 104 is of a legal age to purchase the product. As another example, product 128 may be a hot food item and validation request 148 may be a request to ensure that the item is currently available (e.g., that the item has been prepared and is ready for customer 104 to receive). As a further example, product 128 may be associated with a random and/or algorithm-based check and validation request 148 may be a request to ensure that the physical products in customer 104's possession are only those that customer 104 has added to digital cart 110. In such embodiments, merchant device 114 may be configured to determine whether or not the validation requirement 140 associated with validation request 148 is satisfied. The process by which merchant device 114 receives validation request 148 and determines whether the validation requirement 140 associated with the validation request 148 is satisfied is described in further detail below, in the discussion of FIGS. 5A through 5F.

Merchant device 114 includes any appropriate device for communicating with components of system 100 over network 130 and displaying information on a display 116. For example, merchant device 114 may be a telephone, a mobile phone, a laptop, a wireless or cellular telephone, a tablet, a server, an IoT device, and/or an automated assistant, among others. This disclosure contemplates merchant device 114 being any appropriate device for sending and receiving communications over network 130 and displaying information on a display 116. In certain embodiments, display 116 may be an integrated part of merchant device 114. In some embodiments, display 116 may be an external display capable of connecting to merchant device 114. In addition to display 116, merchant devices 114 may include a user interface, such as a microphone, keypad, or other appropriate terminal equipment usable by merchant 112, and/or an audio output component, such as a speaker. In some embodiments, an application executed by a processor of merchant device 114 may perform the functions described herein. Merchant device 114 may be implemented using the hardware, memory, and interface of device 900, described with respect to FIG. 9 below.

In certain embodiments, validation system 100 includes validation terminal 122. Validation terminal 122 includes barcode reader 124. Validation terminal 122 is generally configured to use barcode reader 124 to read and process barcodes provided by mobile devices 106. For example, validation terminal 122 may read and process a barcode provided to mobile device 106 after mobile device 106 has completed a transaction (e.g., after submitting payment for one or more products added by customer 104 to digital cart 110). In certain embodiments, in response to reading a valid barcode, validation terminal 122 may visually and/or audibly indicate that a customer transaction has been validated. Validation terminal 122 may be implemented using the hardware, memory, and interface of device 900, described with respect to FIG. 9 below. The use of validation terminal 122 to validate a completed transaction is described in further detail below, in the discussion of FIG. 7.

Validation system 100 is configured to process and validate transactions initiated by mobile device 106 within physical location 102, by enabling interprocess communication between mobile device 106, merchant device 114, cloud server 132, and, in certain embodiments, validation terminal 122. In particular, mobile device 106, merchant device 114, cloud server 132, and, in certain embodiments, validation terminal 122 may be in signal communication with each other using any suitable type of network 130 or network connection.

This disclosure contemplates network 130 being any suitable network operable to facilitate communication between the components of system 100. Network 130 may include any interconnecting system capable of transmitting audio, video, signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Cloud server 132 may be any suitable type of server or other network device as would be appreciated by one of ordinary skill in the art. Cloud server 132 may be formed by one or more physical devices configured to provide services and resources (e.g., data and/or hardware resources) for mobile devices 106, merchant devices 114, and, in certain embodiments, validation terminals 122. Cloud server 132 may be implemented using the hardware, memory, and interface of device 900, described with respect to FIG. 9 below.

In general, cloud server 132 is configured to communicate with mobile device 106, merchant device 114, and, in certain embodiments, validation terminal 122 to facilitate and process a transaction initiated by customer 104 using his/her mobile device 106, while located in a physical location 102. As an example, cloud server 132 may receive product identification information 146 for one or more products 128 selected by mobile device 106, use this identification information to obtain purchase information for the product from product inventory 138, and store this purchase information in digital cart 110. Cloud server 132 may then communicate digital cart 110 and/or information stored in digital cart 110 to mobile device 106 and merchant device 114. As another example, cloud server 132 may identify a validation requirement 140 associated with a product 128 added by mobile device 106 to digital cart 110, transmit a request 148 to merchant device 114 seeking that merchant device 114 determine whether or not the validation requirement 140 is satisfied, and prevent mobile device 106 from completing a transaction involving the product until a response 150 is received from merchant device 114. In response to receiving an indication 150 from merchant device 114 that the validation requirement is satisfied, cloud server 132 may enable mobile device 106 to complete a transaction involving the product. On the other hand, in response to receiving an indication 150 from merchant device 114 that the validation requirement is not satisfied, cloud server 132 may remove the product from digital cart 110, before enabling mobile device 106 to complete a transaction involving the remaining products in digital cart 110. As a further example, cloud server 132 may receive a transaction request 154 from mobile device 106 for a transaction involving the products 128 added to digital cart 110, use payment information provided by user 104 to process the transaction, and transmit an indication 156 that the transaction has been completed to merchant device 114 and/or mobile device 106. In certain such embodiments, cloud server 132 may additionally transmit a barcode 158 to mobile device 106, which mobile device 106 may provide to validation terminal 122, to validate the completed transaction.

As illustrated in FIG. 1, cloud server 132 enables mobile device 106, merchant device 114, and, in certain embodiments, validation terminal 122 to communicate and/or cooperate with one another, where mobile device 106, merchant device 114, and, in certain embodiments, validation terminal 122 are located within the same physical location 102. Physical location 102 is a location or business that sells one or more products. Examples of physical location 102 include, but are not limited to, stores, buildings, shopping centers, malls, or any other suitable location. Each physical location 102 includes one or more merchant devices 114. In certain embodiments, each physical location 102 may also include one or more validation terminals 122. In response to a mobile device 106 entering physical location 102, cloud server 130 is configured to enable communication between mobile device 106, merchant device 114, and, in certain embodiments, validation terminal 122. For example, in certain embodiments, physical location 102, along with the merchant device(s) 114 and, in certain embodiments, validation terminal(s) 122 located within physical location 102, are uniquely linked with a store identifier 126. Store identifier 126 may be any suitable type of identifier as would be appreciated by one of ordinary skill in the art. For example, store identifier 126 may comprise an alphanumeric string. In such embodiments, in response to determining that mobile device 106 has entered physical location 102, cloud server 132 may determine store identifier 126, linked to physical location 102, and enable communication between mobile device 106 and the merchant device(s) 114 and, in certain embodiments, validation terminal(s) 122 linked to the same store identifier 126.

Physical locations 102 may be identifiable in any suitable manner. As an example, in certain embodiments, mobile application 108 may display a "select a store" option on mobile device 106, through which customer 104 may indicate the physical location 102 within which the customer is shopping. For example, customer 104 may select physical location 102 by choosing from a drop-down menu of available locations, by entering all or part of a street address, and/or in any other suitable manner. As another example, in certain embodiments, physical location 102 may be identified based on the Bluetooth connections available to mobile device 106. For example, physical location 102 may be identified by determining that a Bluetooth connection is available between mobile device 106 and merchant device 114 located within physical location 102. As a further example, in certain embodiments, physical locations 102 may be identifiable using a geofence 144. A geofence 144 is a virtual geographical boundary that is defined using Global Positioning System (GPS) or radio frequency identification (RFID) technology. Using geofences 144, a physical location 102 along with one or more merchant devices 114 and, in certain embodiments, one or more validation terminals 122 located at physical location 102, may be linked with a physical address and/or GPS coordinates. The physical address and/or GPS coordinates may be stored by cloud server 132 as store location information 136. In some embodiments, cloud server 132 may use geofences 144 to determine whether a mobile device 106 has entered or exited a physical location 102. As an example, cloud server 132 may determine whether mobile device 106 has entered or exited physical location 102 based on a comparison between location information 152 provided by the mobile device 106 and store location information 136 determined using geofence 144. For example, cloud server 132 may determine that mobile device 106 has entered physical location 102 in response to determining that location information 152 is associated with a location within a boundary of locations defined by store location information 136. In such embodiments, cloud server 132 may be configured to use this process to enable or disable mobile device 106's ability to perform a mobile device self-checkout process. For example, in response to determining that mobile device 106 has entered a physical location 102, cloud server 132 may be configured to enable mobile device 106's ability to add products to digital cart 110.

Modifications, additions, or omissions may be made to the systems described herein without departing from the scope of the invention. For example, system 100 may include any number of customers 104, mobile devices 106, merchants 112, merchant devices 114, validation terminals 122, networks 130, and cloud servers 132. The components may be integrated or separated. Moreover, the operations may be performed by more, fewer, or other components. Additionally, the operations may be performed using any suitable logic comprising software, hardware, and/or other logic.

II. Digital Cart Monitoring

Figure 2:
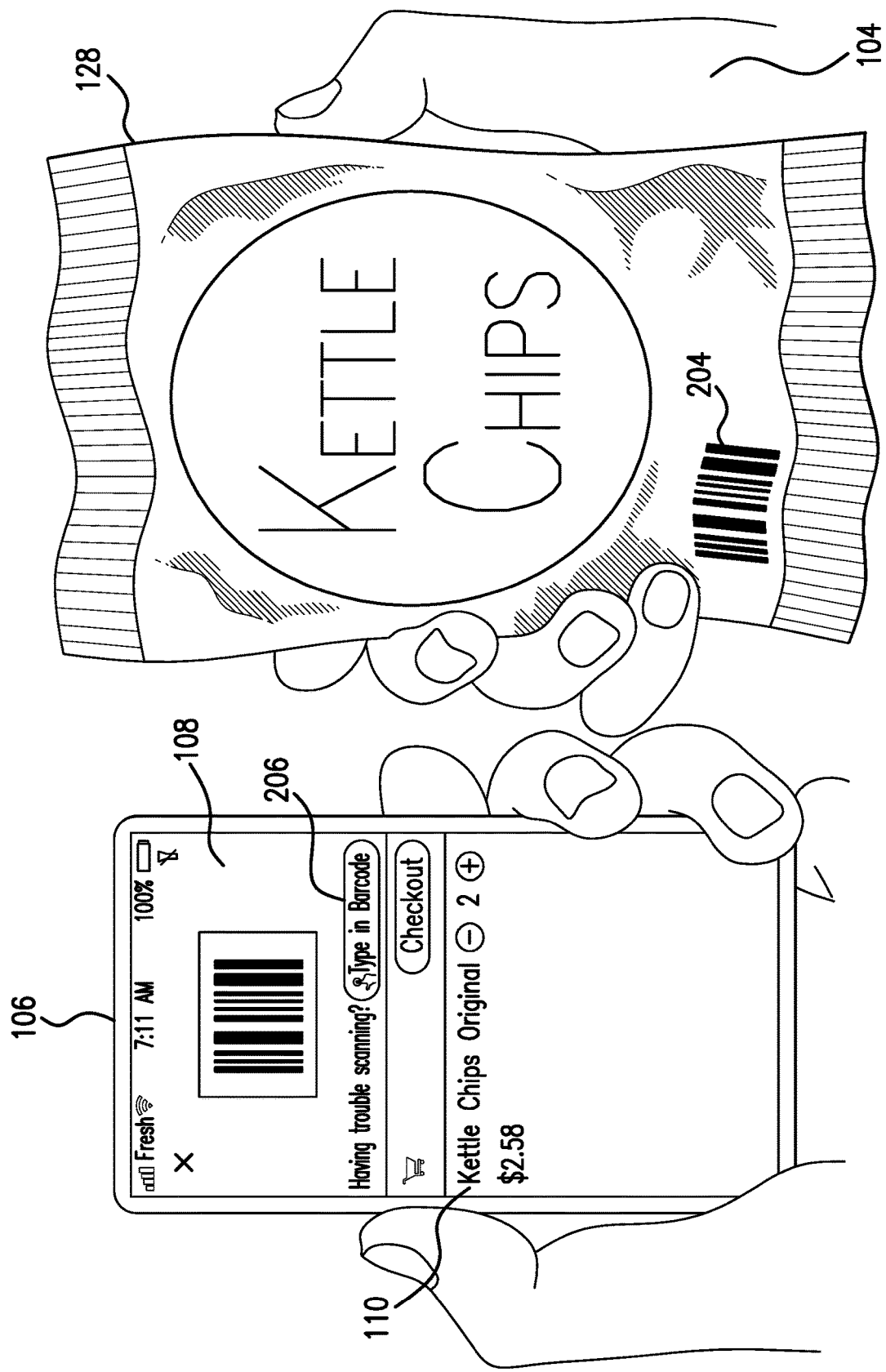
FIG. 2 presents an example of a customer using a mobile device during a mobile self-checkout process conducted using the system of FIG. 1.

FIG. 2 presents an example of a customer 104 using a mobile device 106 during a mobile self-checkout process. In certain embodiments mobile device 106 initiates the mobile self-checkout process by sending a request 145 to cloud server 132, as illustrated in FIG. 1. As an example, customer 104 may interact with mobile application 108, running on mobile device 106, to communicate with cloud server 132. For example, customer 104 may select a button of a graphical user interface displayed by mobile application 108 on mobile device 106, to indicate that customer 104 is ready to initiate the self-checkout process. In certain embodiments, request 145 may include location information 152. In such embodiments, in response to mobile device sending request 145 to cloud server 132, cloud server 132 may determine whether mobile device 106 is located within physical location 102, by determining whether location information 152 is associated with a location within a boundary of locations defined by store location information 136.

In response to determining that mobile device 106 is located within physical location 102, cloud server 132 is configured to enable mobile device 106 to engage in the mobile self-checkout process. For example, cloud server 132 may enable a feature of mobile application 108, which allows customer 104 to use mobile device 106 to enter product identification information 146 into mobile application 108. Product identification information 146 may be any information that can be used to identify product 128. For example, product identification information 146 may include an image, a barcode, a product name, a product description, price information, or any other suitable information for identifying a product 128. Customer 104 may use mobile device 106 to enter product identification information 146 into mobile application 108 in any suitable manner. As an example, in certain embodiments, customer 104 may enter product identification information 146 into mobile application 108 by scanning product 128, using a camera of mobile device 106. Mobile device 106 may scan barcode 204 (e.g., a stock keeping unit (SKU) barcode, a universal product code (UPC) barcode, a Quick Response (QR) code, etc.), labels, or any portion of product 128. In one embodiment, mobile device 106 uses a camera to scan or take a picture of barcode 204 on product 128, to obtain product identification information 146. In another embodiment, mobile device 106 may capture an image of product 128 using a camera and may perform object recognition to identify and obtain product identification information 146 for product 128. As another example, in certain embodiments, customer 104 may enter product identification information 146 into mobile application 108 by manually entering a barcode number of barcode 204 into a specified location 206 of a graphical user interface displayed by mobile application 108 on mobile device 106. For example, customer 104 may use a keypad of mobile device 106 to manually enter barcode 204 into the graphical user interface displayed by mobile application 108. As a further example, in certain embodiments, customer 104 may enter product identification information 146 into mobile application 108 by selecting product 128 from a list (e.g., a drop-down menu) displayed by mobile application 108.

In certain embodiments, mobile application 108 may display a help button on mobile device 106. Customer 104 may interact with the help button if he/she is having difficulty inputting product identification information 146 into mobile device 106 and/or requires assistance for any other reason. In response to customer 104 interacting with the help button, mobile device 106 may transmit a message to cloud server 132 indicating that customer 104 is in need of assistance. Cloud server 132 may then transmit a help request to merchant device 114. In response to receiving the help request, merchant device 114 may display an indication of the help request on display 116, which may notify merchant 112 that a customer 104 within store 102 is in need of assistance.

Mobile device 106 uses product identification information 146 to add product 128 to digital cart 110. For example, in certain embodiments, mobile device 106 sends product identification information 146 to cloud server 132. Cloud server 132 may use product identification information 146 to identify product 128 in product inventory 138. For example, cloud server 132 may identify product 128 in product inventory 138 by locating identification information 146 in product inventory 138 and identifying the product 128 associated with product identification information 146. For each product 128 offered for sale in store 102, product inventory 138 may include identification information 146 as well as additional product information. For example, for a given product 128, product inventory 138 may include a barcode number for the product, a description of the product, a price of the product, and/or any discounts associated with the product.

In response to using product identification information 146 to identify product 128 in product inventory 138, cloud server 132 adds product 128 to digital cart 110. Digital cart 110 is a virtual shopping cart that is associated with customer 104. Digital cart 110 includes information about products 128 that customer 104 has added to his/her virtual shopping cart. For example, cloud server 132 may generate an entry in digital cart 110 that includes a description of product 128, a quantity for product 128, a price for product 128, and/or any other suitable type of information for product 128.

As illustrated in FIG. 2, digital cart 110 is accessible (i.e., viewable) from mobile application 108 running on mobile device 106. For example, cloud server 132 may send digital cart 110 and/or information about digital cart 110 to mobile device 106. Mobile application 108 may use this information to display digital cart 110 on mobile device 106. The communication between mobile device 106 and cloud server 132 (namely, mobile device 106 sending product identification information 146 to cloud server 132 and cloud server 132 sending information about digital cart 110 to mobile device 106) is such that digital cart 110, as displayed by mobile device 106, may be updated in approximately real time as mobile device 106 scans products 128.

Figure 3A:
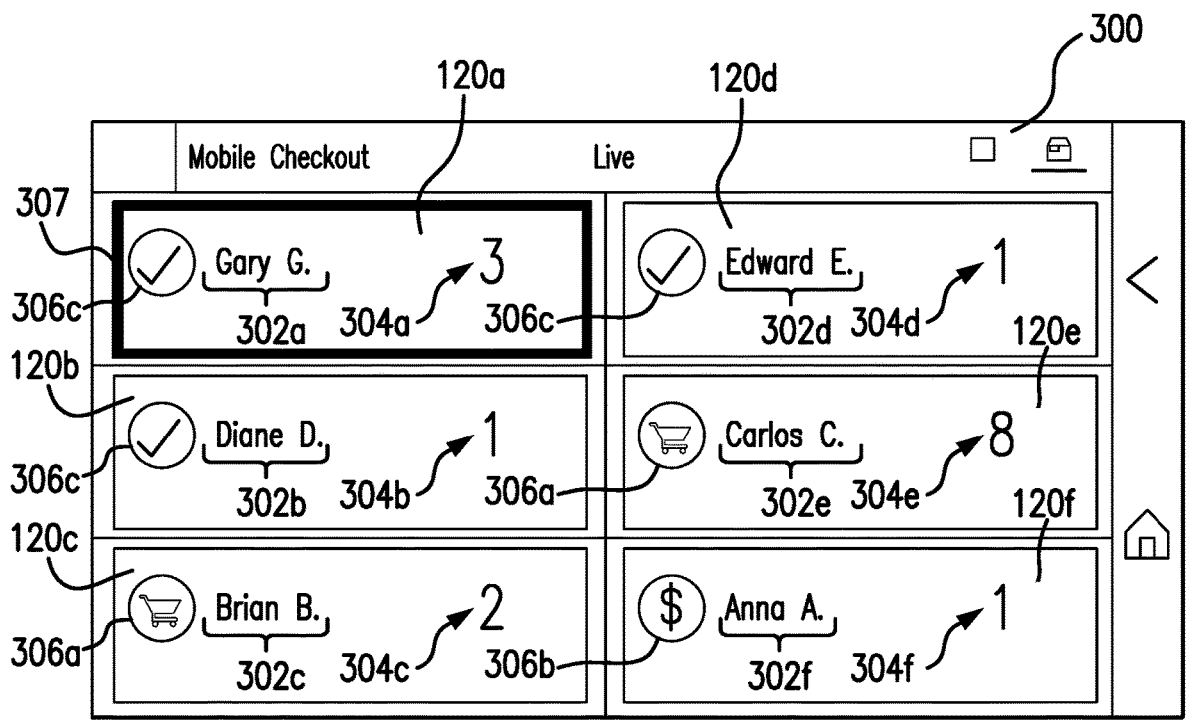
FIGS. 3A through 3C present example screenshots from a merchant device configured to monitor the digital shopping carts of customers in the example validation system of FIG. 1.
Figure 3B:
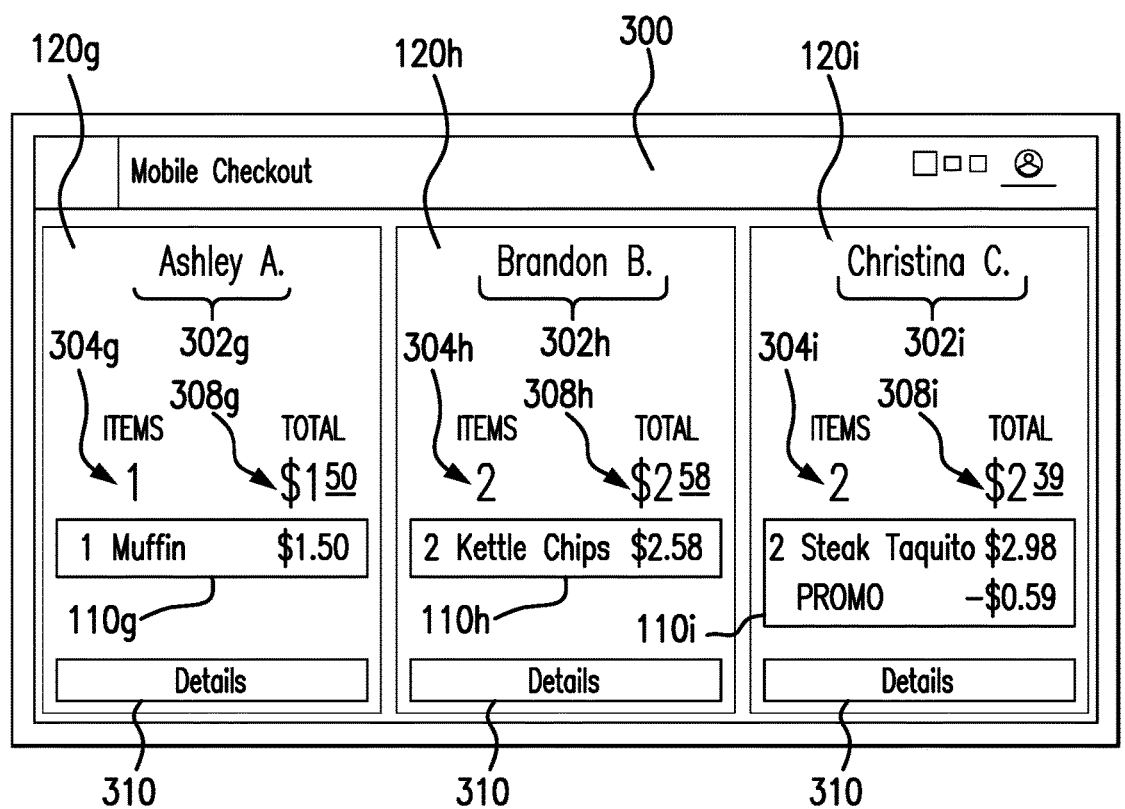
Figure 3C:
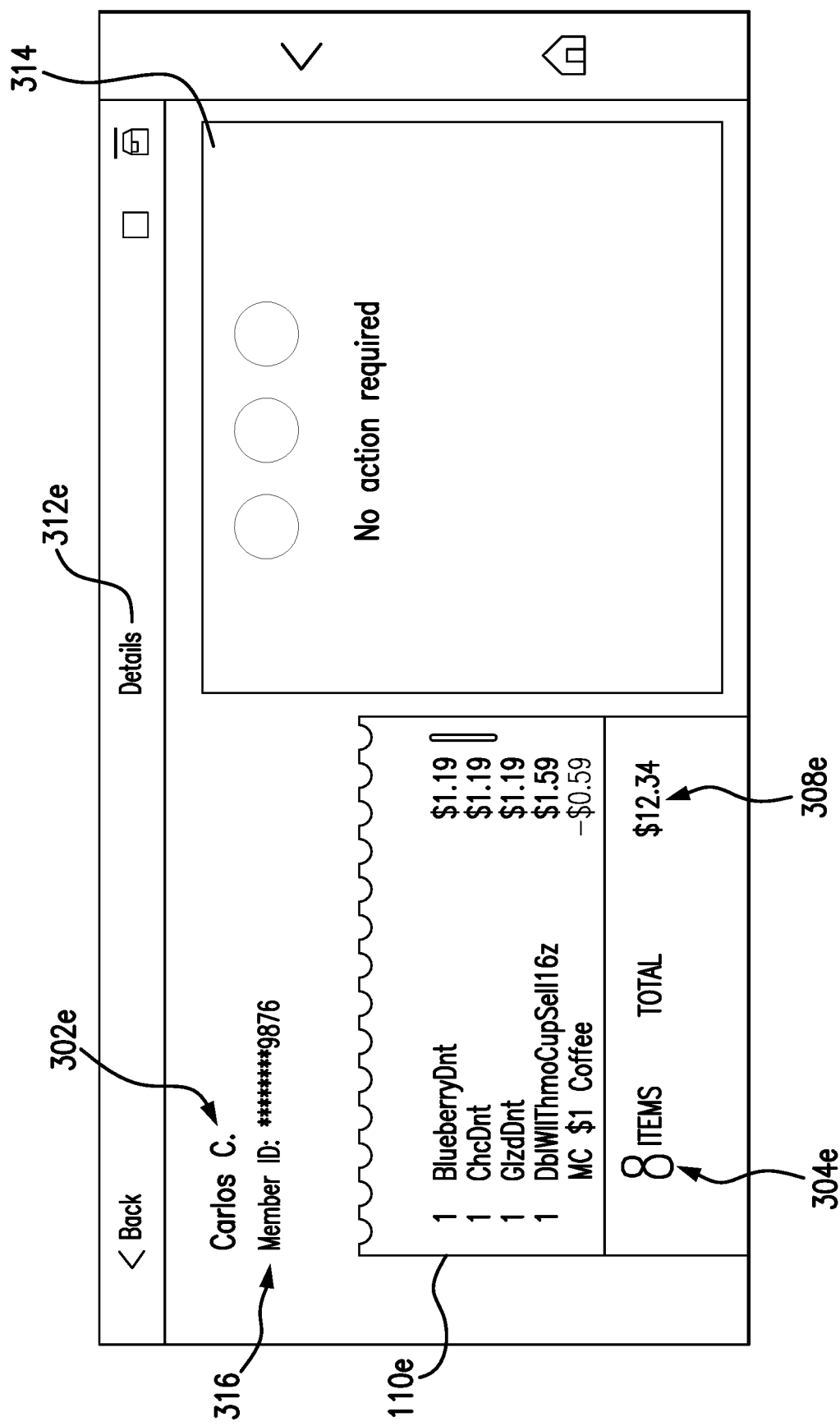

Cloud server 132 may also send digital cart 110 and/or information about digital cart 110 to merchant device 114. This communication between cloud server 132 and merchant device 114 is such that merchant device 114 may receive updates to digital cart 110 in approximately real time as mobile device 106 scans products 128. Merchant device 114 is configured to use this information to enable a merchant 112 to monitor one or more mobile self-checkout shopping sessions conducted by customers 104 within store 102. FIGS. 3A through 3C illustrate the manner by which a merchant 112 may use merchant device 114 to monitor one or more mobile self-checkout shopping sessions.

As illustrated in FIGS. 3A and 3B, merchant device 114 is configured to display, on display 116 of merchant device 114, transaction profiles 120 for those customers 104 conducting mobile self-checkout shopping sessions within store 102. Each transaction profile 120 includes information associated with a specific mobile self-checkout shopping session conducted by a given customer 104 within physical location 102. For example, each transaction profile 120 includes customer profile information 142 received by merchant device 114 from cloud server 132. Customer profile information 142 may include any suitable information associated with customer 104. For example, in certain embodiments, customer profile information 142 may include a name 302 of customer 104 (e.g., a first name of customer 104, a first name and last initial of customer 104, or a first and last name of customer 104), an identification number for customer 104, and/or information related to customer 104's previous self-checkout transactions (e.g., the number of previous self-checkout transactions that customer 104 has completed, the date customer 104 first installed and set up mobile application 108 on his/her mobile device 106 to enable him/her to engage in mobile self-checkout transactions, etc.). In some embodiments, customer profile information 142 may include information that may assist merchant 112 in identifying customer 104. For example, customer profile information 142 may include a photo of customer 104. In certain embodiments, cloud server 132 receives at least a portion of customer profile information 142 from mobile device 106. For example, cloud server 132 may receive customer profile information 142 that customer 104 entered into mobile application 108 when signing up to use mobile application 108 to engage in mobile self-checkout transactions.

Cloud server 132 is configured to send customer profile information 142 to merchant device 114 in response to determining that customer 104 has initiated a mobile self-checkout transaction within physical location 102, using mobile device 106. Cloud server 132 may determine that customer 104 has initiated a mobile self-checkout transaction within physical location 102 in any suitable manner. As an example, in certain embodiments, cloud server 132 is configured to send customer profile information 142 to merchant device 114 in response to receiving product information 146 for a first product 128 scanned by mobile device 106. As another example, in certain embodiments, cloud server 132 is configured to send customer profile information 142 to merchant device 114 in response to receiving request 145 from mobile device 106, indicating that customer 104 is seeking to initiate the mobile self-checkout process within store 102.

In addition to customer profile information 142, each transaction profile 120 also includes information associated with digital cart 110. Accordingly, in addition to sending customer profile information 142 to merchant device 114, in response to determining that customer 104 has initiated a mobile self-checkout transaction within physical location 102 using mobile device 106, cloud server 132 is also configured to send digital cart 110 and/or information about digital cart 110 to merchant device 114, each time a product 128 is added to digital cart 110. In response to receiving customer profile information 142, digital cart 110, and/or information about digital cart 110 from cloud server 132, merchant device 114 is configured to display a transaction profile 120 for customer 104 on display 116 of merchant device 114. FIGS. 3A and 3B present example screenshots from merchant device 114, illustrating two example embodiments of merchant device 114 displaying transaction profiles 120 on display 116.

As illustrated in FIG. 3A, in certain embodiments, displaying transaction profile 120 on display 116 may include displaying a customer name 302 and a number of products 304 that customer 104 has placed in his/her digital cart 110 on a region of display 116. For example, as illustrated in FIG. 3A, transaction profile 120a indicates that Gary G. has 3 products in his digital cart 110, transaction profile 120b indicates that Diane D. has 1 product in her digital cart 110, transaction profile 120c indicates that Brian B. has 2 products in his digital cart 110, transaction profile 120d indicates that Edward E. has 1 product in his digital cart 110, transaction profile 120e indicates that Carlos C. has 8 products in his digital cart 110, and transaction profile 120f indicates that Anna A. has 1 product in her digital cart 110. In some embodiments, displaying transaction profile 120 on display 116 may also include displaying a status 306 of customer 104's digital cart 110. For example, status 306a indicates Brian B. and Carlos C. are currently adding products to their digital carts 110, status 306b indicates that Anna A. has submitted a request to complete a transaction for the products in her digital cart 110, and status 306c indicates that Gary G., Diane D., and Edward E. have completed transactions for the products in their digital carts 110. In embodiments in which customers 104 may validate their transactions using validation terminal 122, a transaction profile 120, displayed on merchant terminal 114, may also indicate whether or not customer 104 has validated his/her transaction using validation terminal 122. For example, in certain such embodiments, merchant terminal 114 may applying highlighting 307 to transaction profile 120, in indicate that customer 104 has validated his/her transaction using validation terminal 122. As an example, highlighting 307 around transaction profile 120a indicates that Gary G. has validated his transaction using validation terminal 122. While illustrated in FIG. 3A as a border around profile 120a, highlighting 307 may be anything used to distinguish profile 120a from the other profiles 120b through 120f. For example, highlighting 307 may include changing a color of profile 120a as compared to the other profiles 120b through 120f.

As illustrated in FIG. 3B, in certain embodiments, displaying transaction profile 120 on display 116 may include displaying a customer name 302, a number of products 304 that customer 104 has placed in his/her digital cart 110, all or a portion of digital cart 110, and a total cost 308 for the products that customer 104 has placed in his/her digital cart 110, on a region of display 116. For example, as illustrated in FIG. 3B, transaction profile 120g indicates that Ashley A. has 1 product in her digital cart 110g (a muffin priced at $1.50), for a total cost of $1.50, transaction profile 120h indicates that Brandon B. has 2 products in his digital cart 110h (2 packages of kettle chips, priced at $2.58), for a total cost of $2.58, and transaction profile 120i indicates that Christina C. has 2 products in her digital cart 110i (2 steak taquitos, originally priced at $2.98, with a discount of $0.59), for a total cost of $2.39.

In certain embodiments, and as illustrated in FIGS. 3A and 3B, application 118, installed on merchant device 114, is configured to display a home page 300 on display 116, where home page 300 includes transaction profiles 120 for each customer 104 currently engaged in a mobile self-checkout process within store 102. In certain embodiments, in addition to displaying transaction profiles 120 for each customer 104 currently engaged in a mobile self-checkout process within store 102, merchant device 114 may also display transaction profiles 120 for customers 104 who have recently completed the mobile self-checkout process (e.g., have paid for the products in their digital carts and/or have validated their transactions using validation terminal 122). For example, merchant device 114 may display transaction profiles 120 for those customers 104 who have completed the mobile self-checkout process within a set time interval of the current time (e.g., within the last five minutes). In some embodiments, once a profile 120 has been removed from homepage 300, merchant 112 may view the profile by navigating to a history page, which displays profiles 120 associated with mobile self-checkout transactions that have been completed within a set time interval of the current time (e.g., within the last 24 hours).

Displaying transaction profiles 120 for each customer 104 currently engaged in a mobile self-checkout process within store 102 may provide merchant 112 with a general overview of the mobile self-checkout transactions being conducted by customers 104 within store 102. In certain embodiments, merchant 112 may obtain more detailed information about the mobile self-checkout process of a given customer 104, by selecting the transaction profile 120 belonging to that customer from home page 300. Merchant 112 may select a given transaction profile 120 from home page 300 in any suitable manner. As an example, in certain embodiments, merchant 112 may select transaction profile 120 from home page 300 by touching the region of display 116 on which transaction profile 120 is displayed. As another example, in some embodiments, merchant 112 may select transaction profile 120 from home page 300 by interacting with a button 310, displayed on the same region of display 116 on which transaction profile 120 is displayed.

FIG. 3C presents an example screenshot from merchant device 114, in an embodiment in which merchant device 114 is displaying a page 312 of detailed information associated with a single customer 104. Merchant device 114 may display detailed information page 312 for customer 104, in response to merchant 112 selecting transaction profile 120, belonging to customer 104 from home page 300. For example, merchant device 114 may display detailed information page 312e for Carlos C., in response to merchant 112 selecting transaction profile 120e, belonging to Carlos C., from home page 300.

Detailed information page 312 may include any appropriate information related to customer 104 and/or digital cart 110 of customer 104. For example, as illustrated in FIG. 3C, detailed information page 312 may include customer name 302, membership information 316 (e.g., a membership identification number, the number of previous self-checkout transactions that customer 104 has completed, and/or the date customer 104 first installed and set up mobile application 108), digital cart 110, the number 304 of products in customer 104's digital cart 110, and/or the total cost 308 of the products in customer 104's digital cart. In certain embodiments, detailed information page 312 may also include a section 314, which indicates whether any of the products in customer 104's digital cart 110 are associated with a validation requirement 140.

In certain embodiments, displaying transaction profiles 120 and/or detailed information page 312 on merchant device 114 may enable merchant 112 to efficiently monitor the mobile self-checkout transactions conducted by customers 104 within store 102. As an example, if transaction profile 120 indicates that a given customer 104 has only one item in his/her digital cart 110, but merchant 112 sees that customer 104 has a large number of products in his/her possession, this may indicate that customer 104 needs assistance in adding products to his/her digital cart 110. As another example, merchant 112 may compare the products that customer 104 has added to his/her digital cart 110 with the products that customer 104 has in his/her physical possession, to determine whether customer 104 has properly added each product in his/her physical possession to his/her digital cart 110.

In certain embodiments, merchant device 114 may be configured to display analytics associated with the mobile self-checkout transactions conducted within physical location 102. For example, in certain embodiments, merchant 112 may navigate from homepage 300 to an analytics page. The analytics page may display (1) the percentage of historical transactions conducted within physical location 102 that were mobile self-checkout transactions, (2) the weekly number of new mobile self-checkout customers, (3) the most popular products (or categories of products) purchased through the mobile self-checkout process, and/or (4) any other suitable analytics. Displaying such analytics may assist merchants 112 in evaluating the usefulness of the mobile self-checkout process.

III. Digital Cart Validation

In certain embodiments, one or more of the products that customer 104 adds to his/her digital cart 110 may be associated with a validation requirement 140, such that customer 104 may not be permitted to purchase the product(s) unless the validation requirement is satisfied. This disclosure contemplates that mobile device 106, merchant device 114, and cloud server 132 are configured to cooperate with one another to (1) identify and evaluate any validation requirement(s) 140, (2) enable customer 104 to purchase the product(s) if the validation requirement(s) 140 associated with the product(s) is satisfied, and (3) prevent customer 104 from purchasing the product(s) if the validation requirement(s) 140 associated with the product(s) are not satisfied. FIGS. 4 through 6 illustrate this process.

Figure 4B:
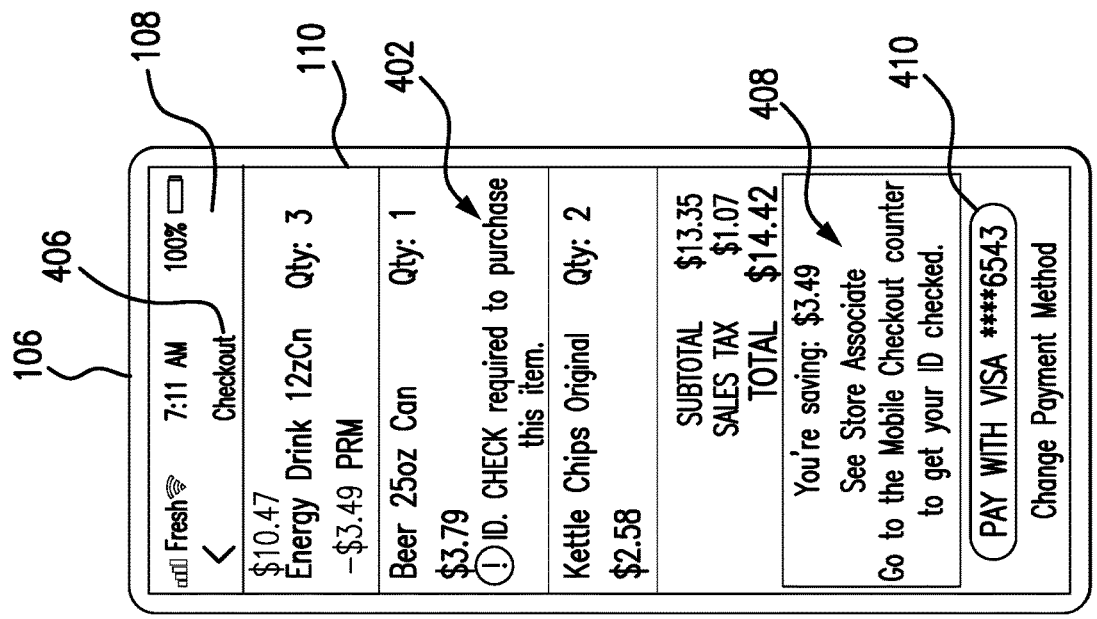
FIGS. 4A and 4B present example screenshots from a mobile device of the example validation system of FIG. 1, after a customer using the mobile device has added a product associated with a validation requirement to his/her digital shopping cart.
Figure 4A:
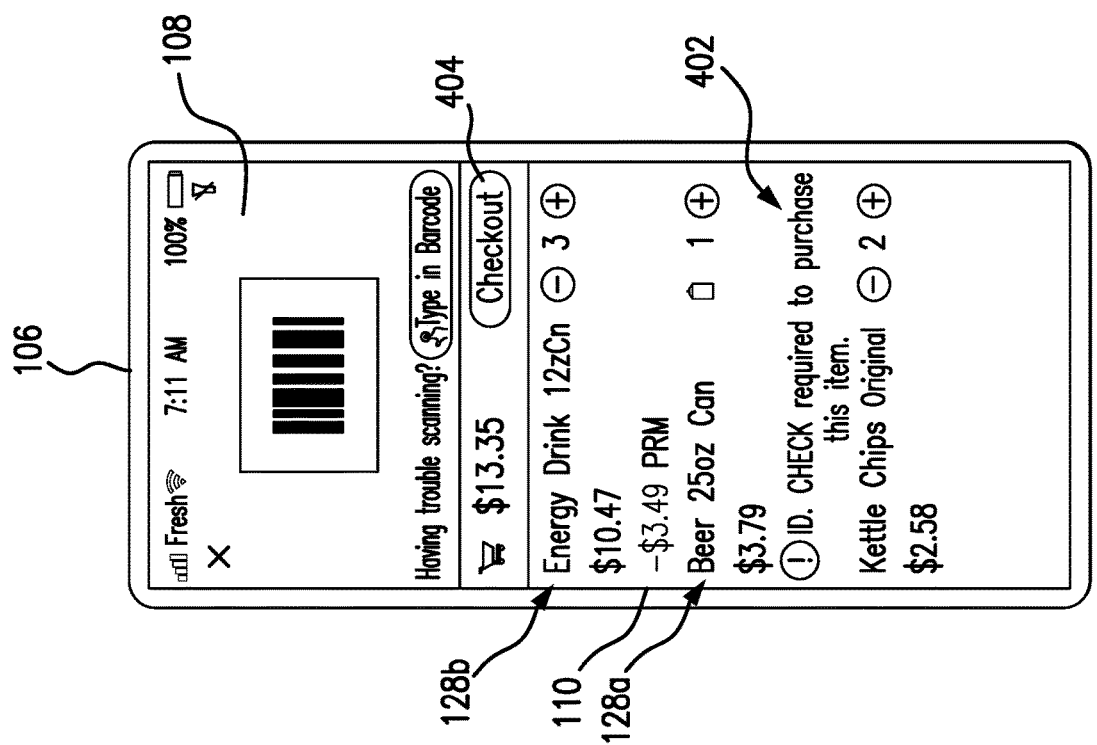

FIGS. 4A and 4B present example screenshots from mobile device 106 after the mobile device has added a product 128a, associated with a validation requirement 140, to digital shopping cart 110. FIGS. 4A and 4B present an example in which customer 104 has added alcohol 128a to his/her digital cart 110, and the validation requirement 140 is a requirement that the age of customer 104 is at least the minimum legal age for purchasing alcohol. However, this disclosure contemplates that product 128a may be associated with any suitable validation requirement 140. As an example, in addition to alcohol, the product may be another age-restricted product (e.g., a lottery ticket, cigarettes, etc.) and validation requirement 140 may be a requirement that customer 104 is of a legal age to purchase the product. As another example, the product may be a hot food item and validation requirement 140 may be a requirement that the item is currently available (e.g., that the item has been prepared and is ready for customer 104 to receive). As a further example, the product may be associated with a random check (e.g., cloud server 132 may randomly select the product and/or the digital cart 110 containing the product) and/or an algorithm-based check (e.g., cloud server 132 may select the product and/or the digital cart 110 containing the product according to an algorithm) and validation requirement 140 may be a requirement that the physical products in customer 104's possession are only those which customer 104 has added to digital cart 110.

When mobile device 106 scans product 128a, mobile device 106 communicates product identification information 146 to cloud server 132. In certain embodiments, cloud server 132 uses this information to determine whether or not product 128a is associated with a validation requirement 140. As an example, in certain embodiments, cloud server 132 may store each validation requirement 140 along with a list of products 128 to which the validation requirement applies. As another example, where validation requirement 140 is a requirement that the physical products in customer 104's possession are only those that customer 104 has added to digital cart 110, cloud server 132 may randomly decide to apply the validation requirement to product 128a (e.g., cloud server 132 may generate a random number and decide to apply the validation requirement to product 128a if the random number falls within a certain range), in response to receiving product identification information 146 for product 128a and/or in response to receiving a transaction request 154 for the products 128 in customer 104's digital cart 110. As a further example, where validation requirement 140 is a requirement that the physical products in customer 104's possession are only those that customer 104 has added to digital cart 110, cloud server 132 may decide to apply the validation requirement to product 128a based on an algorithm. For example, cloud server 132 may decide to apply the validation requirement to product 128a if (1) product 128a is the Nth product from store 102 added to any digital cart 110, where N is a given number, (2) the digital cart 110 containing product 128a includes more than M products, where M is a given number, (3) digital cart 110 includes a given combination of products 128, and/or (4) any other suitable condition.

In certain embodiments, in response to determining that product 128a is associated with a validation requirement 140, cloud server 132 communicates validation requirement 140 to mobile device 106. In response to receiving validation requirement 140, mobile device 106 displays an indication 402 of validation requirement 140. For example, as illustrated in FIG. 4A, in response to receiving validation requirement 140 for product 128a, mobile device 106 displays indication 402 of validation requirement 136, where indication 402 states that an ID check is required to purchase the product.

In certain embodiments, in response to determining that product 128a is associated with validation requirement 140, cloud server 132 may transmit a message to mobile device 106 instructing mobile application 108 to prevent mobile device 106 from completing a transaction for the products stored in digital cart 110 until cloud server 132 receives an indication 150 of whether or not validation requirement 140 is satisfied. Mobile application 108 may prevent mobile device 106 from completing a transaction for the products stored in digital cart 110 in any suitable manner. As an example, in certain embodiments, in response to receiving an instruction to prevent mobile device 106 from completing a transaction, mobile application 108 may lock itself, thereby preventing mobile device 106 from completing a transaction and/or adding additional products 128 to digital cart 110. As another example, and as illustrated in FIGS. 4A and 4B, in response to receiving an instruction to prevent mobile device 106 from completing a transaction, mobile application 108 may prevent mobile device 106 from submitting a transaction request 154. For example, as illustrated in FIG. 4A, once mobile device 106 has finished adding products 128 to digital cart 110, customer 104 may select checkout button 404, displayed by mobile application 108 on mobile device 106. Selecting checkout button 404 causes mobile application 108 to display checkout page 406, illustrated in FIG. 4B. In response to receiving an instruction to prevent mobile device 106 from completing a transaction for products 128 stored in digital cart 110, mobile application 108 may disable payment button 410, through which customer 104 would otherwise interact to submit transaction request 154. In certain embodiments, checkout page 406 may also display a message 408 to customer 104, indicating those actions that customer 104 should take before being permitted to submit transaction request 154 (e.g., those actions that customer 104 should take to enable merchant device 114 to determine whether or not validation requirement 140 is satisfied). As an example, as illustrated in FIG. 4B, message 408 may indicate that customer 104 should go to a mobile checkout counter to get his/her ID checked. As another example, in certain embodiments, message 408 may indicate that digital cart 110 is associated with a random or algorithm-based bag check and that customer 104 should go to a mobile checkout counter to have the products in his/her physical possession checked against those in his/her digital cart 110. For example, message 408 may state that customer 104 has "been selected for a random bag check," and/or any other suitable message. As a further example, in certain embodiments, message 408 may indicate that one or more products 128 in digital cart 110 are associated with an availability requirement. For example, message 408 may indicate that a hot food item is currently being prepared and/or provide customer 104 with a location within store 102 where he/she should wait to receive the product.

In addition to transmitting validation requirement 140 to mobile device 106, in response to determining that product 128a is associated with the validation requirement 140, cloud server 132 communicates validation request 148 to merchant device 114. Validation request 148 is a request for merchant device 114 to determine whether or not the validation requirement 140 is satisfied. In response to receiving validation request 148, merchant device 114 is configured to determine whether or not validation requirement 140 is satisfied. FIGS. 5A through 5F present an example of the behavior of merchant device 114 in response to receiving validation request 148.

Figure 5A:
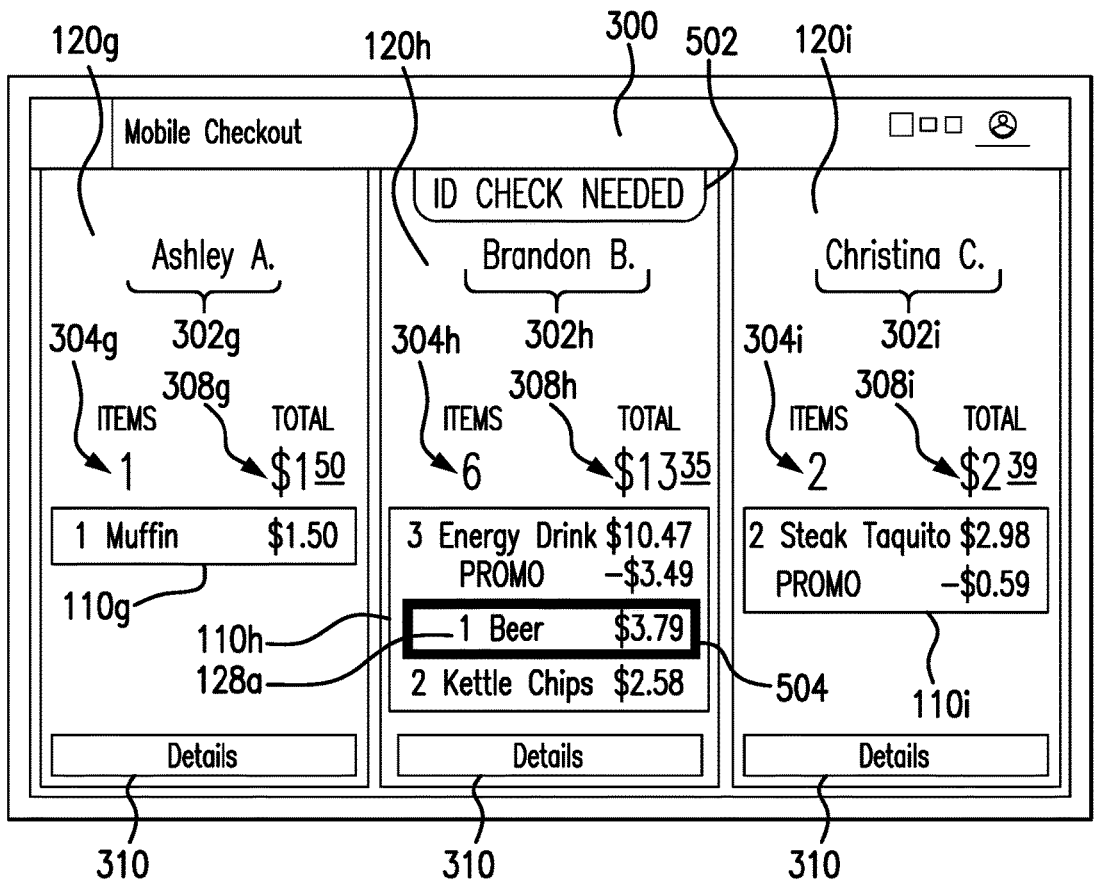
FIGS. 5A through 5F present example screenshots from a merchant device of the example validation system of FIG. 1, illustrating the process by which the merchant device determines whether or not a validation requirement associated with a product a customer added to his/her digital shopping cart is satisfied.

In response to receiving validation request 148, merchant device 114 may display an alert 502 on transaction profile 120, indicating that a product 128 in customer 104's digital cart 110 is associated with a validation requirement 140. For example, as illustrated in FIG. 5A, merchant device 114 may display alert 502 on transaction profile 120h, to indicate that product 128a in Brandon B.'s digital cart 110 is associated with a validation requirement 140. In certain embodiments, alert 502 may provide an indication of the type of the validation requirement 140 applicable to product 128a. For example, as illustrated in FIG. 5A, alert 502 may indicate that Brandon B's ID needs to be checked to ensure that he is of legal age to purchase the product. In some embodiments, merchant device 114 may provide an indication of the specific product 128a associated with validation requirement 140 on transaction profile 120. For example, merchant device 114 may apply highlighting 504 around the product 128a associated with validation requirement 140. As an example, highlighting 504 on transaction profile 120h indicates that the beer in Brandon B.'s digital cart 110 is associated with the validation requirement 140. While illustrated in FIG. 5A as a border around the description of product 128a, displayed on profile 120h, highlighting 504 may be anything used to distinguish product 128a from the other products displayed on profile 120. For example, highlighting 504 may include changing a color of the background behind the description of product 128a, in comparison to the backgrounds of the descriptions of the other products in customer 104's digital cart 110. In certain embodiments, in response to receiving validation request 148, merchant device 114 may emit an audio signal. This may be desirable to attract the attention of merchant 112.

Figure 5B:
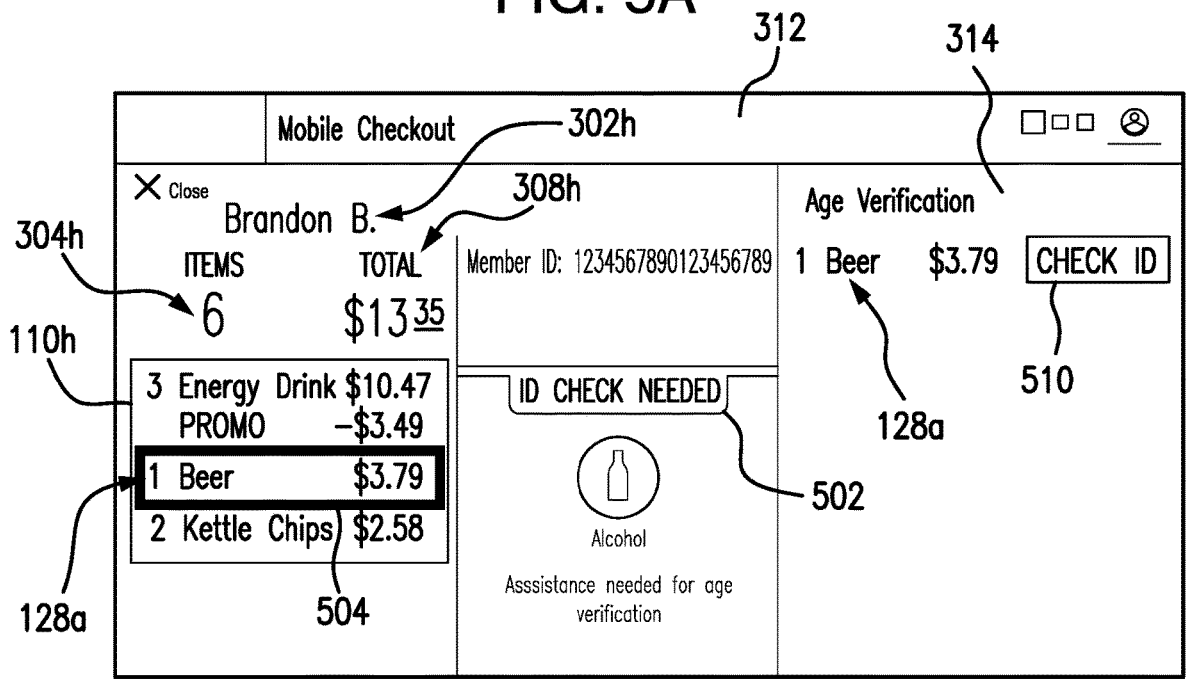

In certain embodiments, merchant 112 may begin the process of evaluating validation requirement 140 by selecting the transaction profile 120 associated with the validation requirement from home page 300. For example, in response to merchant 112 selecting transaction profile 120, merchant device 114 may display detailed information page 312 for customer 104. As illustrated in FIG. 5B, detailed information page 312 may include a section 314 in which any validation requirements 140 associated with products 128 in customer 104's digital cart 110 are displayed. For example, as illustrated in FIG. 5B, section 314 may indicate that product 128a is associated with an age verification requirement. Section 314 may include an interactive button 510 through which merchant 112 may begin the process of evaluating the validation requirement 140. For example, as illustrated in FIG. 5B, merchant 112 may begin the age verification process by interacting with button 510.

Figure 5C:
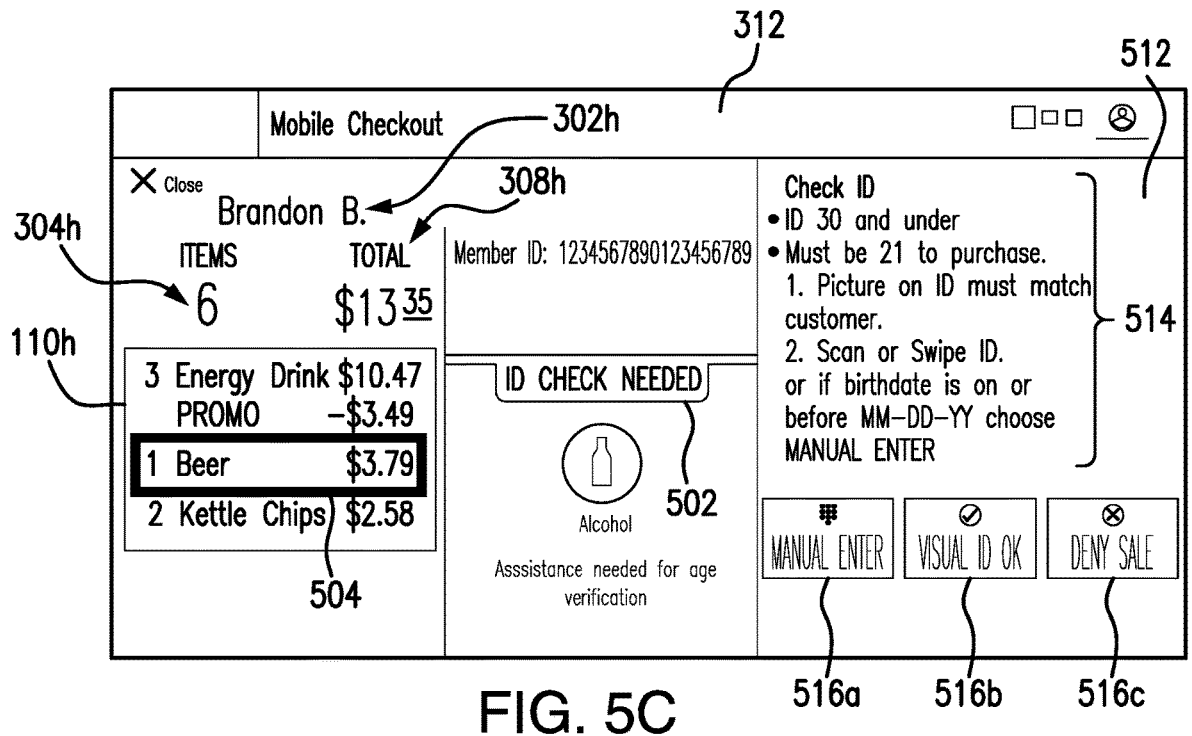
Figure 5D:
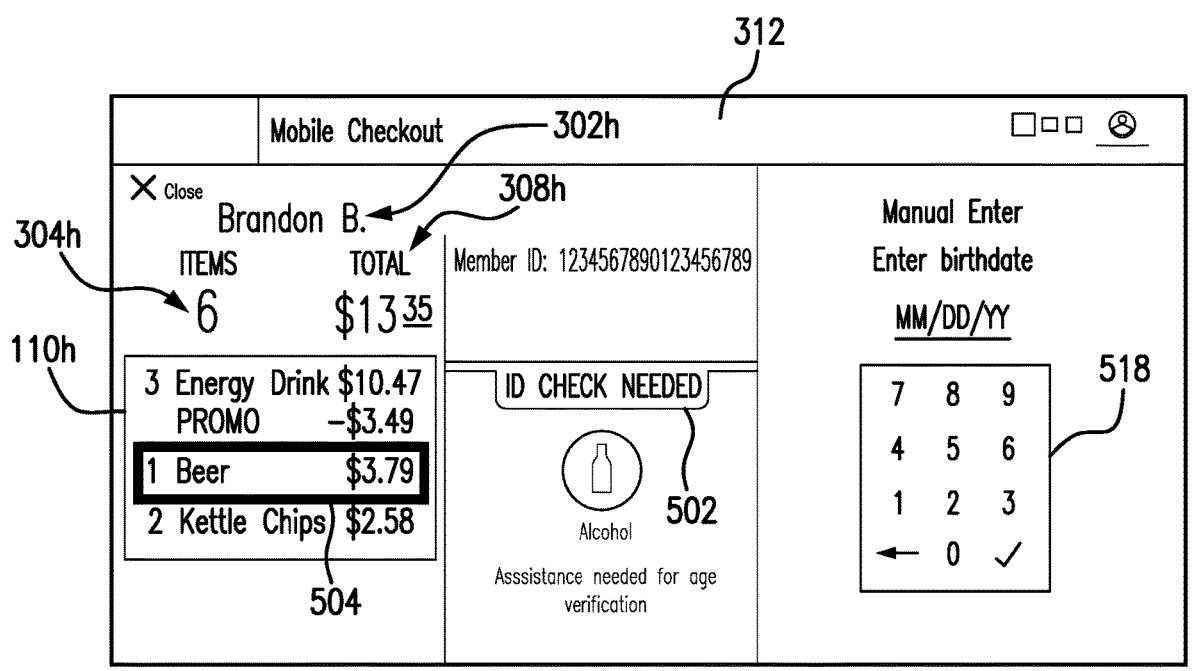

FIGS. 5C through 5F present example screenshots of merchant device 114, in response to merchant 112 interacting with button 510, for a specific example where merchant 112 is evaluating an age verification requirement 140. As illustrated in FIG. 5C, in certain embodiments, in response to merchant 112 interacting with button 510, merchant device 114 may display a set of instructions 514 for merchant 112. Set of instructions 514 may provide instructions for merchant 112, which indicate the manner by which merchant 112 is to evaluate age verification requirement 140. For example, set of instructions 514 may instruct merchant 112 to obtain identification from customer 104, if customer 104 appears to be 30 years of age or younger, and to enter information from the customer's identification card into merchant device 114. In certain embodiments, merchant 112 may provide merchant device 114 with the information to evaluate age verification requirement 140 by using merchant device 114 to swipe or scan the identification card of customer 104. In some embodiments, merchant 112 may provide merchant device 114 with the information to evaluate age verification requirement 140 by interacting with a set of one or more buttons 516. As an example, merchant 112 may interact with button 516b to indicate that merchant 112 has determined that validation requirement 140 is satisfied based on a visual inspection of customer 104. For example, merchant 112 may interact with button 516b after determining, based on a visual inspection of customer 104, that customer 104 is at least 50 years of age or older. As another example, merchant 112 may interact with button 516c to indicate that validation requirement 140 is not satisfied. For example, merchant 112 may interact with button 516c if (1) customer 104 is unable to present identification to merchant 112, (2) the picture on the identification presented by customer 104 does not match customer 104, (3) the date on the identification presented by customer 104 indicates that the age of customer 104 does not meet the age requirement, and/or (4) for any other suitable reason. As a further example, merchant 112 may interact with button 516a, to manually enter the birthdate of customer 104 into merchant device 114. As illustrated in FIG. 5D, in response to merchant 112 interacting with button 516a, merchant device may display a keypad 518 on display 116 through which merchant 112 may manually enter the birthdate of customer 104. Merchant device 114 may then use the birthdate of customer 104 to determine whether or not validation requirement 140 is satisfied.

Figure 5E:
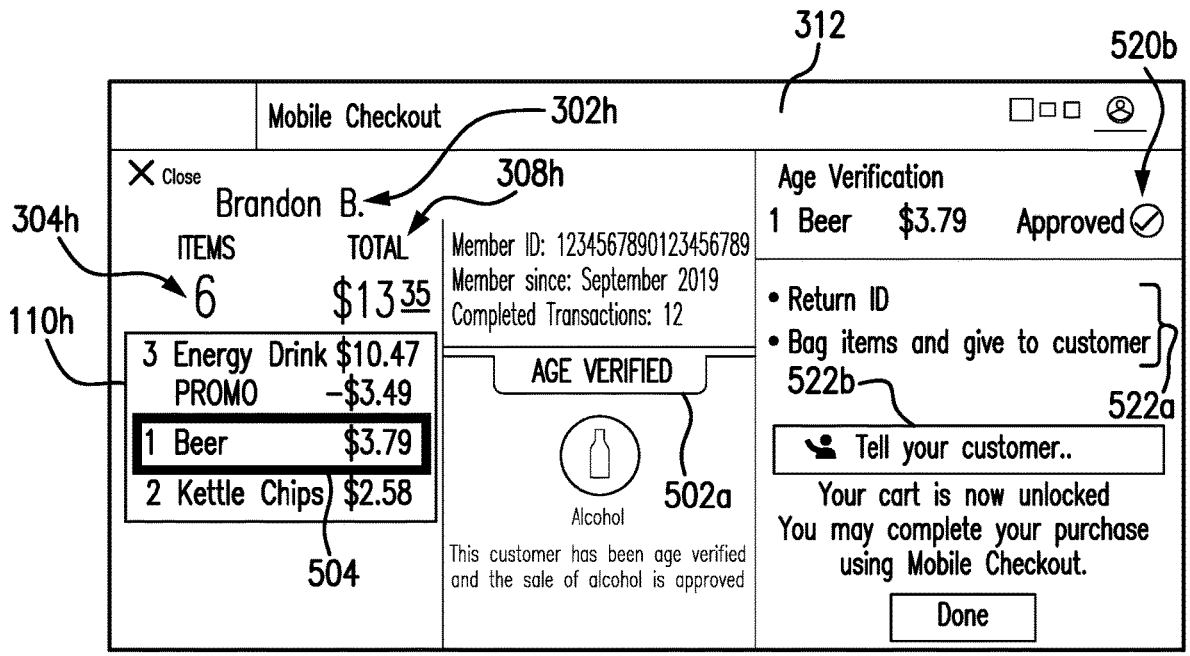
Figure 5F:
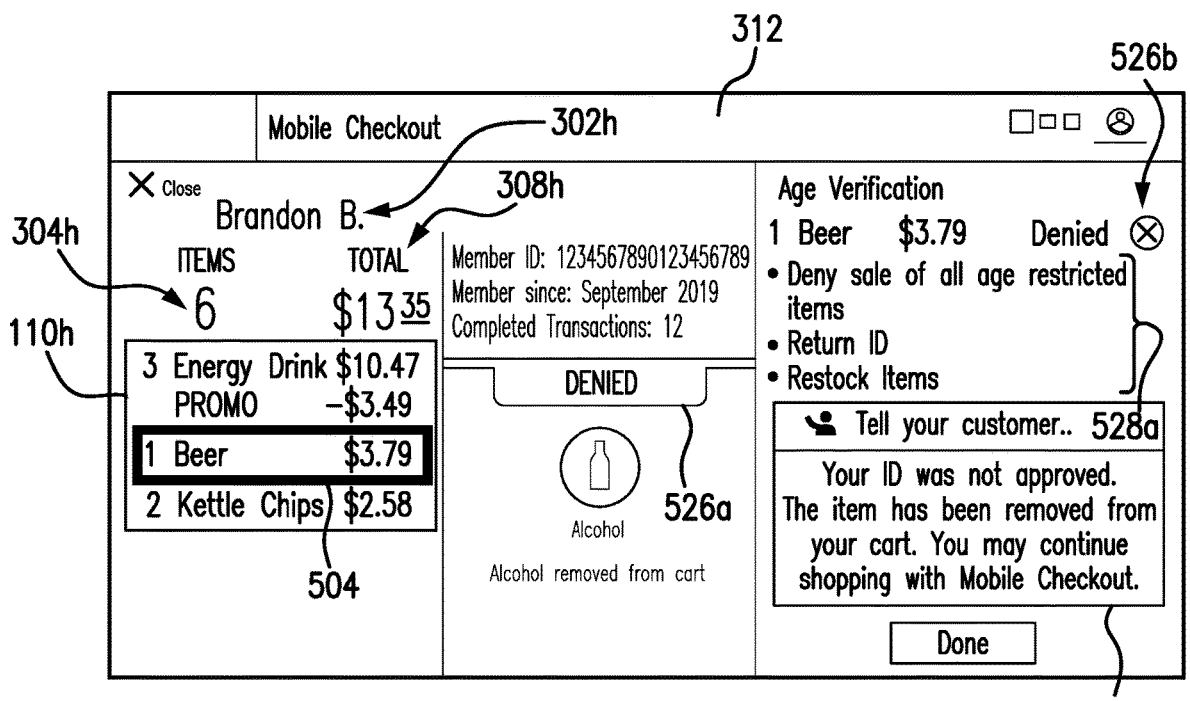

FIGS. 5E and 5F present example screenshots of merchant device 114, in response to merchant device 114 determining whether or not validation requirement 140 is satisfied. As illustrated in FIG. 5E, in response to determining that validation requirement 140 is satisfied, merchant device 114 may display one or more indications 520a,b that validation requirement 140 is satisfied. In certain embodiments, merchant device 114 may additionally display instructions 522a,b for merchant 112. As an example, instructions 522a,b may instruct merchant 112 to return the customer's identification cart to customer 104. As another example, instructions 522a,b may instruct merchant 112 to inform customer 104 that his/her digital cart 110 is now unlocked and that customer 104 may now use his/her mobile device 106 to complete a transaction for the products 128 in digital cart 110. As illustrated in FIG. 5F, in response to determining that validation requirement 140 is not satisfied, merchant device 114 may display one or more indications 526a,b that validation requirement 136 is not satisfied. In certain embodiments, merchant device 114 may additionally display instructions 528a,b for merchant 112. As an example, instructions 528a,b may instruct merchant 112 to obtain the product 128a, associated with the validation requirement, from customer 104. As another example, instructions 522a,b may instruct merchant 112 to inform customer 104 that product 128a has been removed from his/her digital cart 110.

While FIGS. 5C through 5F present example screenshots of merchant device 114, in response to merchant 112 interacting with button 510, for one specific example of merchant 112 evaluating an age verification requirement 140, this disclosure contemplates that merchant device 114 may evaluate a validation requirement 140 in any suitable manner. As example, in some embodiments in which validation requirement 140 is an age verification requirement, merchant device 114 may evaluate validation requirement 140 by performing a biometric scan of customer 104. As another example, in certain embodiments in which validation requirement 140 is a requirement that a product in customer 104's digital cart 110 is currently available (e.g., the product is a hot food item that has been prepared and is ready for customer 104 to receive), merchant device 114 may evaluate validation requirement 140 by receiving an indication that the product is available or that the product is unavailable. For example, merchant 112 may interact with merchant device 114 (e.g., interact with one or more buttons displayed on section 314 of page 312 displayed by merchant device 114) to input into merchant device 114 whether or not the product is available. As another example, in certain embodiments in which validation requirement 140 is a requirement that the physical products in customer 104's possession are only those that customer 104 has added to digital cart 110, merchant device 114 may evaluate validation requirement 140 by scanning the physical products in customer 104's possession and comparing the scanned products to those in customer 104's digital cart 110. As a further example, in certain embodiments in which validation requirement 140 is a requirement that the physical products in customer 104's possession are only those that customer 104 has added to digital cart 110, merchant device 114 may evaluate validation requirement 140 by receiving an indication of whether or not the physical products in customer 104's possession match those that customer 104 has added to digital cart 110. For example, merchant 112 may visually inspect the products 128 in customer 104's possession and then interact with merchant device 114 (e.g., interact with one or more buttons displayed on section 314 of page 312 displayed by merchant device 114) to input into merchant device 114 whether or not the physical products in customer 104's possession match those that customer 104 has added to his/her digital cart 110.

In response to determining whether or not validation requirement 140 is satisfied, merchant device 114 is configured to send an indication of whether or not validation requirement 140 is satisfied to cloud server 132, as validation response 150. In response to receiving a validation response 150 that indicates that validation requirement 140 for a given product 128 is satisfied, cloud server 132 transmits a message to mobile device 106 indicating that validation requirement 140 is satisfied. In response to receiving validation responses that indicate that all of the validation requirements 140 associated with digital cart 110 are satisfied, cloud server 132 transmits a message to mobile device 106 instructing mobile application 108 to allow mobile device 106 to complete a transaction for the products stored in digital cart 110 (including all of the products 128 associated with the validation requirements 140). On the other hand, in response to receiving a validation response 150 that indicates that validation requirement 140 for a given product 128 is not satisfied, cloud server 132 removes the given product 128 from digital cart 110 and communicates the updated digital cart 110 and/or information about the updated digital cart 110 to mobile device 106. Cloud server 132 then transmits a message to mobile device 106 indicating that validation requirement 140 was not satisfied. In response to removing all of the products 128, for which validation requirements 140 were not met, from digital cart 110, cloud server 132 transmits a message to mobile device 106 mobile application 108 to allow mobile device 106 to complete a transaction for the remaining products stored in digital cart 110 (i.e., the products in digital cart 110 other than the products 128 associated with the failed validation requirements 140).

FIGS. 6A and 6B present example screenshots from mobile device 106 in response to receiving a message from cloud server 132 instructing mobile application 108 to allow mobile device 106 to complete a transaction for the products stored in digital cart 110. FIG. 6A presents an example in which the validation requirement 140 associated with product 128a was satisfied, while FIG. 6B presents an example in which the validation requirement associated with product 128a was not satisfied.

As illustrated in FIG. 6A, in certain embodiments, in response to receiving an indication from cloud server 132 that validation requirement 140 is satisfied, mobile application 108 may display an indication 602 on mobile device 106 that validation requirement 140 is satisfied. For example, as illustrated in FIG. 6A, mobile application may display indication 602 on mobile device 106 stating that the identification of customer 104 was checked and indicated that customer 104 is of at least the legal age required to purchase product 128a. In response to receiving a message from cloud server 132 instructing mobile application 108 to allow mobile device 106 to complete a transaction for the products stored in digital cart 110, mobile application 108 is configured to enable mobile device 106 to complete a transaction for the products stored in digital cart 110. Mobile application 108 may enable mobile device 106 to complete a transaction for the products stored in digital cart 110 in any suitable manner. As an example, in certain embodiments, in response to receiving an instruction from cloud server 132 to enable mobile device 106 to complete a transaction, mobile application 108 may unlock itself, thereby allowing mobile device 106 to complete a transaction and/or to add additional products 128 to digital cart 110. As another example, and as illustrated in FIG. 6A, in response to receiving an instruction from cloud server 132 to enable mobile device 106 to complete a transaction, mobile application 108 may enable payment button 410, through which customer 104 may interact to submit a transaction request 154. In some embodiments, mobile application 108 may also display a message 604 on mobile device 106 indicating that customer 104 may now complete his/her transaction.

As illustrated in FIG. 6B, in certain embodiments, in response to receiving an indication from cloud server 132 that validation requirement 140 is not satisfied, mobile application 108 may display a message 608 on mobile device 106 indicating that validation requirement 140 is not satisfied and/or that product 128a, associated with the validation requirement 140, has been removed from digital cart 110. For example, as illustrated in FIG. 6B, mobile application 108 may display indication 608 on mobile device 106 stating that the age restricted product 128a has been removed from digital cart 110. In response to cloud server 132 communicating an updated digital cart 110 that does not include product 128a, for which validation requirement 140 was not satisfied, and/or information about the updated digital cart 110 to mobile device 106, mobile device 106 displays digital cart 110 that does not include product 128a for which validation requirement 140 was not satisfied. After product 128a, for which validation requirement 140 was not satisfied, has been removed from digital cart 110, cloud server 132 transmits a message to mobile device 106 instructing mobile application 108 to allow mobile device 106 to complete a transaction for the products stored in digital cart 110. In response, mobile application 108 is configured to enable mobile device 106 to complete a transaction for the remaining products stored in digital cart 110. Mobile application 108 may enable mobile device 106 to complete a transaction for the remaining products stored in digital cart 110 in any suitable manner. As an example, in certain embodiments, in response to receiving an instruction from cloud server 132 to enable mobile device 106 to complete a transaction, mobile application 108 may unlock itself, thereby allowing mobile device 106 to complete a transaction and/or to add additional products 128 to digital cart 110. As another example, and as illustrated in FIG. 6B, in response to receiving an instruction from cloud server 132 to enable mobile device 106 to complete a transaction, mobile application 108 may enable payment button 410, through which customer 104 may interact to submit a transaction request 154.

In certain embodiments, transaction request 154 may include payment information for facilitating a transaction for the products 128 in digital cart 110. In some embodiments, transaction request 154 may grant cloud server 132 permission to access payment information for facilitating the transaction, where the payment information is stored by cloud server 132. The payment information may include credit card information, account information, online payment service information, or any other suitable type of financial information for making an electronic transaction. In response to receiving transaction request 154, cloud server 132 is configured to process the requested transaction based on the payment information received in transaction request 154 and/or stored by cloud server 132. For example, cloud server 132 may use the payment information to facilitate an electronic purchase of the products 128 in digital cart 110.

In response to successfully processing the transaction, cloud server 132 is configured to send confirmation information 156 to merchant device 114 and/or mobile device 106. Confirmation information 156 indicates that the transaction was successfully processed and includes any suitable information associated with the transaction. In response to receiving confirmation information 156, mobile device 106 may display confirmation information 156 and/or information associated with confirmation information 156. For example, mobile device 106 may display a message indicating that the transaction was successfully processed. Similarly, in response to receiving confirmation information 156, merchant device 106 may display confirmation information 156 and/or information associated with confirmation information 156. For example, merchant device 114 may display an indication on profile 120 that the transaction was successfully processed. As an example, merchant device 114 may display status 306c on profile 120 to indicate that the transaction has been completed.

Figure 7A:
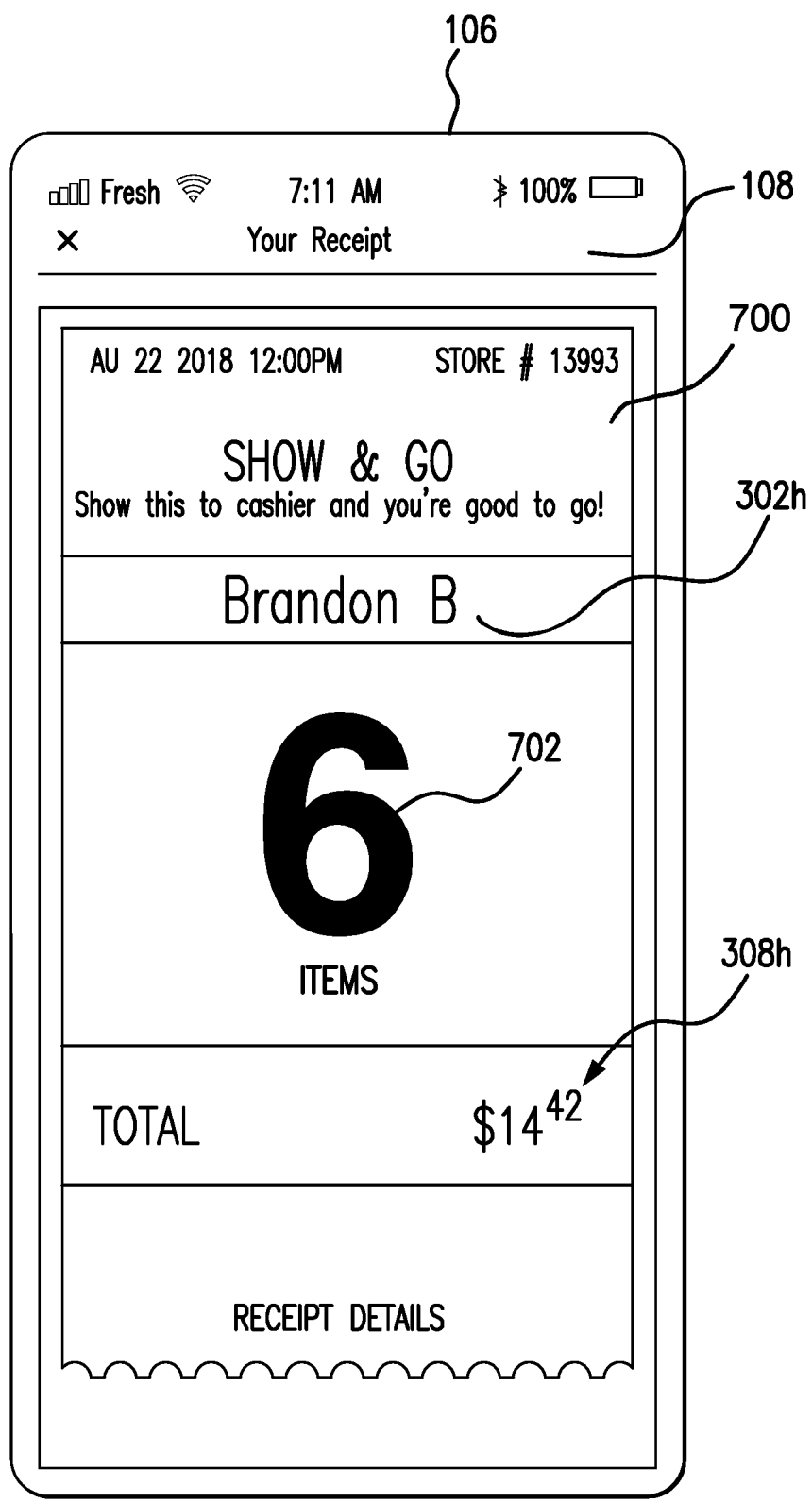
FIGS. 7A and 7B presents example screenshots from a mobile device of the example validation system of FIG. 1, that may be used to validate a digital shopping cart transaction in embodiments without a validation terminal and with a validation terminal, respectively.

In certain embodiments, in response to receiving confirmation information 156, mobile application 108 may display a confirmation page 700 on mobile device that includes a dynamic component. Confirmation page 700 may be presented to merchant 112 who may determine that the transaction conducted by mobile device 106 is valid based on the presence of the dynamic component on confirmation page 700 as well as the presence of an indication on profile 120, displayed on merchant device 114, that the transaction was successfully processed. For example, FIG. 7A presents an example screenshot of mobile device 106 in an embodiment in which the dynamic component displayed on confirmation page 700 is a pulsating number 702 indicating the total number of products 128 in customer 104's digital cart 110. When displayed on mobile device 106, the size of pulsating number 702 oscillates between a small size and a larger size. In addition to pulsating number 702, mobile device 106 may display the name 302 of customer 104 and the total price 308 of the products within customer 104's digital cart 110 on confirmation page 700. Before exiting store 102, customer 104 may present confirmation page 700 to merchant 112. Merchant 112 may then determine that the transaction conducted by customer 104 is valid by determining that confirmation page 700 includes pulsating number 702 (as opposed to a non-pulsating number, characteristic of a screenshot of a previously displayed confirmation page 700) and that the profile 120 on merchant device 114 corresponding to the name 302 displayed on confirmation page 700 includes an indication that the transaction was successfully processed. While FIG. 7A presents an example in which the dynamic component displayed on confirmation page 700 is a pulsating number 702, this disclosure contemplates that the dynamic component may be any suitable animation or other moving component. In certain embodiments in which system 100 includes validation terminal 122, in response to processing transaction request 154, cloud server 132 is configured to generate a barcode 158 and transmit the barcode to mobile device 106. Cloud server 132 may generate barcode 158 based on customer profile information 142, store identifier 126, information about the transaction (e.g., product identification information 146 and/or any other product information, a purchase amount, etc.), a timestamp (e.g., a date and time) for when the transaction was made, or any other suitable type of information. The generated barcode 158 is configured to embed or encode the information that is used to generate the barcode. This information may be recovered later by other devices (e.g., validation terminal 122). Examples of barcodes include, but are not limited to, one-dimensional barcodes (e.g., SKU barcodes and UPC barcodes) and two-dimensional barcodes (e.g., matrix barcodes and QR codes). Cloud server 132 may employ any suitable technique for generating barcode 158.

Figure 7B:
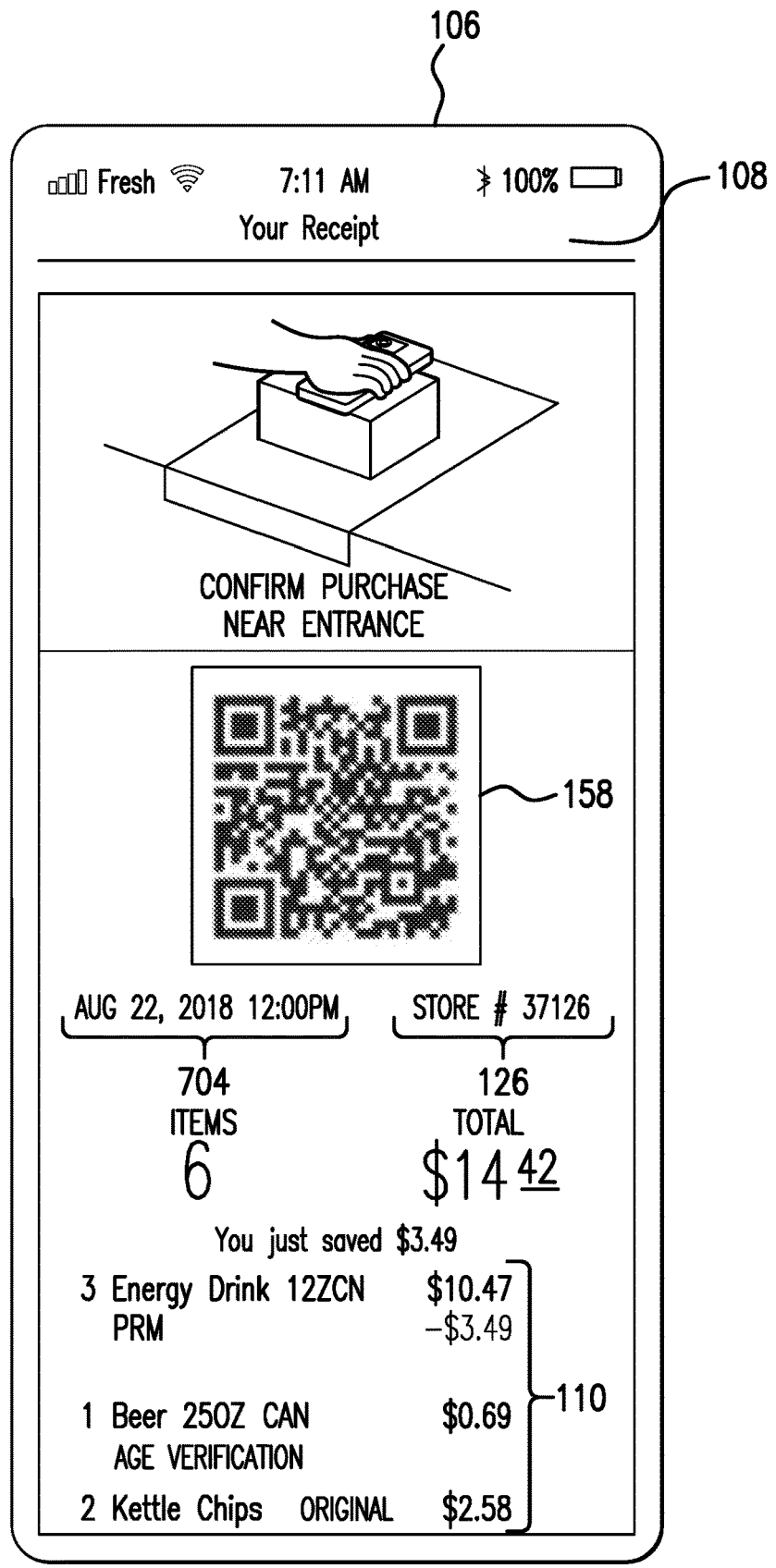

FIG. 7B presents an example screenshot of mobile device 106 in response to receiving barcode 158 from cloud server 132. In addition to displaying barcode 158, mobile device 106 may display any other suitable information related to the transaction. For example, as illustrated in FIG. 7B, mobile device 106 may display a timestamp 704, a store identifier 126, and/or all or a portion of digital cart 110 and/or information related to digital cart 110. In this example, the barcode 158 is a two-dimensional barcode (e.g., a QR code). Timestamp 704 may include the date and/or time when the transaction was processed or completed. Store identifier 126 identifies the location where the transaction was made.

Mobile device 106 may use barcode 158 to interact with validation terminal 122, in order to validate a completed transaction. For example, customer 104 may place the display of mobile device 106 adjacent to a barcode reader 124 of validation terminal 122 to present barcode 158 to validation terminal 122. Validation terminal 122 may then read barcode 158 and determine whether barcode 158 is valid. This disclosure contemplates that validation terminal 122 may determine whether barcode 158 is valid in any suitable manner. As an example, in certain embodiments, validation terminal 122 may determine whether barcode 158 is valid by processing the barcode to retrieve timestamp 704 (e.g., a date and/or time) for when the transaction was made, and determining whether the timestamp is within a predetermined time window. For example, validation terminal 122 may determine that barcode 158 is valid when timestamp 704 is within the past five minutes, ten minutes, fifteen minutes, or any other suitable time window. On the other hand, validation terminal 122 may determine that barcode 158 is invalid when timestamp 704 is outside the given time interval. This security feature may help to prevent customers 104 from reusing barcodes from previous transactions. In some embodiments, barcode 158 is a single use barcode, and validation terminal 122 may determine whether barcode 158 is valid by determining whether barcode 158 has previously been scanned. For example, validation terminal 122 may determine that barcode 158 is valid when barcode 158 has not previously been scanned by any validation terminals 122. On the other hand, validation terminal 122 may determine that barcode 158 is invalid when barcode 158 has previously been scanned by it or another validation terminal 122. In some embodiments, validation terminal 122 may use any other criteria or combination of criteria for determining whether barcode 158 is valid.

In response to determining that barcode 158 is invalid, validation terminal 122 indicates that the transaction is invalid. Validation terminal 122 may indicate that the transaction is invalid in any suitable manner. As an example, in certain embodiments, validation terminal 122 may activate (i.e., turn on) one or more red light emitting diodes (LEDs) to indicate that the transaction is invalid. As another example, validation terminal 122 may present a visual indicator on a display that indicates that the transaction is invalid. By indicating that the transaction is invalid, validation terminal 122 may alert merchant 112 and/or a worker within store 102 that attention may need to be given to customer 104. In certain embodiments, validation terminal 122 may send an alert 160 indicating that the transaction is invalid. As an example, validation terminal 122 may send an alert 160 to cloud server 132 indicating that the transaction is invalid. Cloud server 132 may then send the alert to merchant device 114. In response to receiving the alert, merchant device 114 may display an indication that the transaction is invalid on display 116 of merchant device 114. For example, merchant device 114 may use highlighting 307 on profile 120 to display the indication that the transaction is invalid. For instance, highlighting 307 may include changing a color of profile 120 to red. In some embodiments, cloud server 132 may send the alert to mobile device 106. The alert may include information about the invalid transaction. Application 108, installed on mobile device 106, may display this information on the mobile device. As another example, in certain embodiments, validation terminal 122 may send an alert 160 directly to mobile device 106 and/or merchant device 114 indicating that the transaction is invalid. The alert may be an email, a text message, an application pop-up alert, or any other suitable type of message notification.

In response to determining that barcode 158 is valid, validation terminal 122 indicates that the transaction is valid. Validation terminal 122 may indicate that the transaction is valid in any suitable manner. As an example, in certain embodiments, validation terminal 122 may activate (i.e., turn on) one or more green LEDs to indicate that the transaction is valid. As another example, validation terminal 122 may present a visual indicator on a display that indicates that the transaction is valid. By indicating that the transaction is valid, validation terminal 122 may enable a merchant 112 and/or a worker within store 102 to visually confirm that a transaction was valid and that customer 104 therefore does not require any assistance. This may also provide customer 104 with the confidence to leave store 102 without worrying that merchant 112 may think that customer 104 did not pay for the products that he/she purchased through the mobile self-checkout process. In certain embodiments, validation terminal 122 may send an alert 160 indicating that the transaction is valid. As an example, validation terminal 122 may send an alert 160 to cloud server 132 indicating that the transaction is valid. Cloud server 132 may then send the alert 160 to merchant device 114. In response to receiving the alert, merchant device 114 may display an indication that the transaction is valid on display 116 of merchant device 114. For example, merchant device 114 may use highlighting 307 on profile 120 to display the indication that the transaction is valid. For instance, highlighting 307 may include changing a color of profile 120 to green. In some embodiments, cloud server 132 may send the alert 160 to mobile device 106. The alert may include information about the valid transaction. Application 108, installed on mobile device 106, may display this information on the mobile device. As another example, in certain embodiments, validation terminal 122 may send an alert 160 directly to mobile device 106 and/or merchant device 114 indicating that the transaction is valid. The alert may be an email, a text message, an application pop-up alert, or any other suitable type of message notification.

In certain embodiments, in addition to purchasing products 128 through the mobile self-checkout process, customers 104 may also request a refund through the mobile self-checkout process. For example, a customer 104 may request a refund after determining that he/she accidentally scanned a product 128 multiple times and/or after returning a product 128 to physical location 102 that he/she decided not to purchase. In such embodiments, customer 104 may request a refund by interacting with a button displayed by mobile application 108 on mobile device 106. In response, mobile device 106 may transmit a message to cloud server 132 indicating that customer 104 is seeking a refund for one or more products 128 that he/she purchased through the mobile self-checkout process. Cloud server 132 may then transmit a refund request to merchant device 114. In response to receiving such a request, merchant device 114 may display an indication of the refund request on display 116 and determine whether or not the refund request is valid. Merchant device 114 then communicates this determination to cloud server 132. If merchant device 114 determines that the refund request is valid, cloud server 132 may refund an account of customer 104 for the price of the product(s) 128 associated with the refund request.

IV. Method to Cooperatively Process a Transaction

Figure 8A:
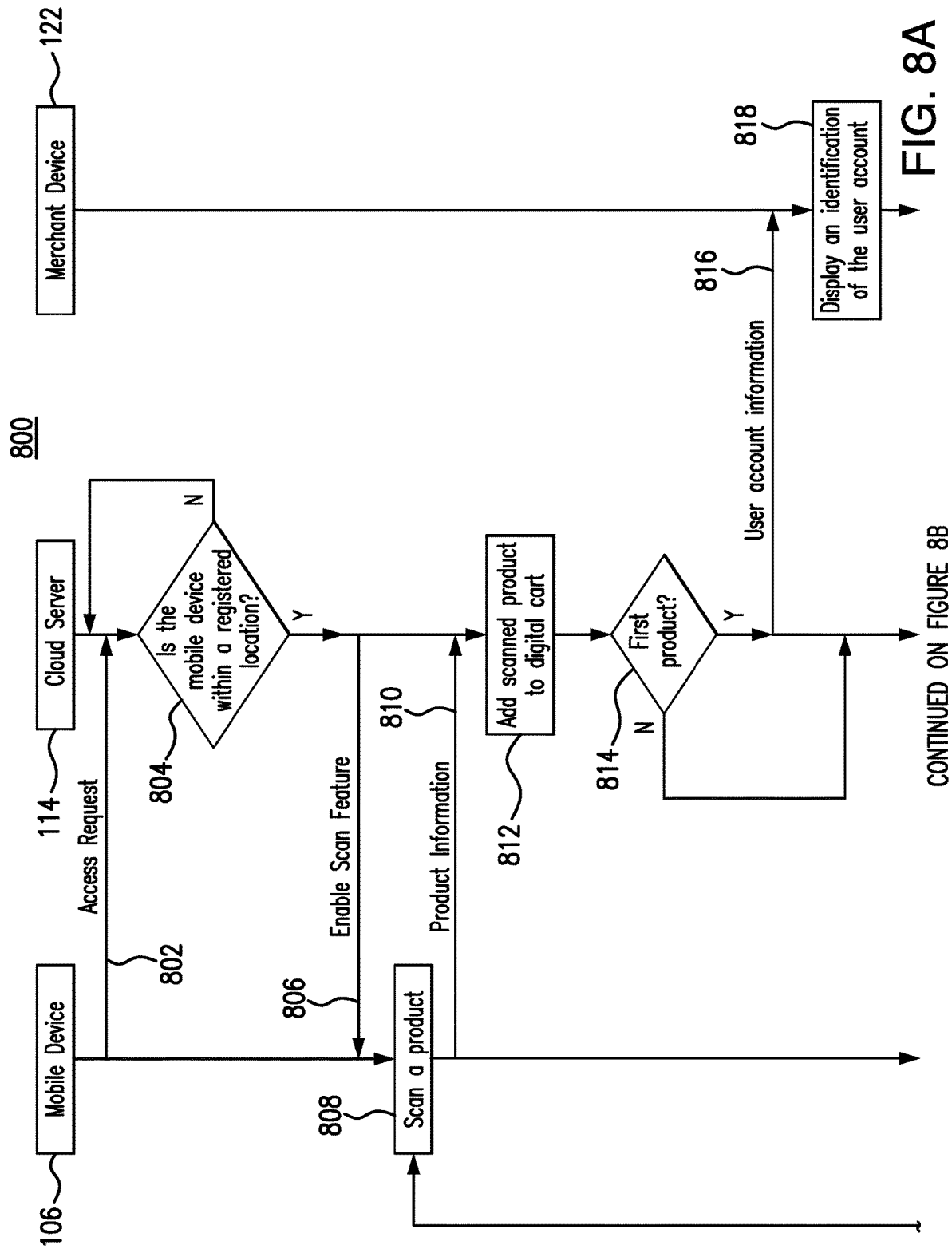
FIGS. 8A-8C present a flowchart illustrating the process by which a mobile device, merchant device, and cloud server of the example validation system of FIG. 1 cooperative to monitor and process a transaction initiated by the mobile device.
Figure 8B:
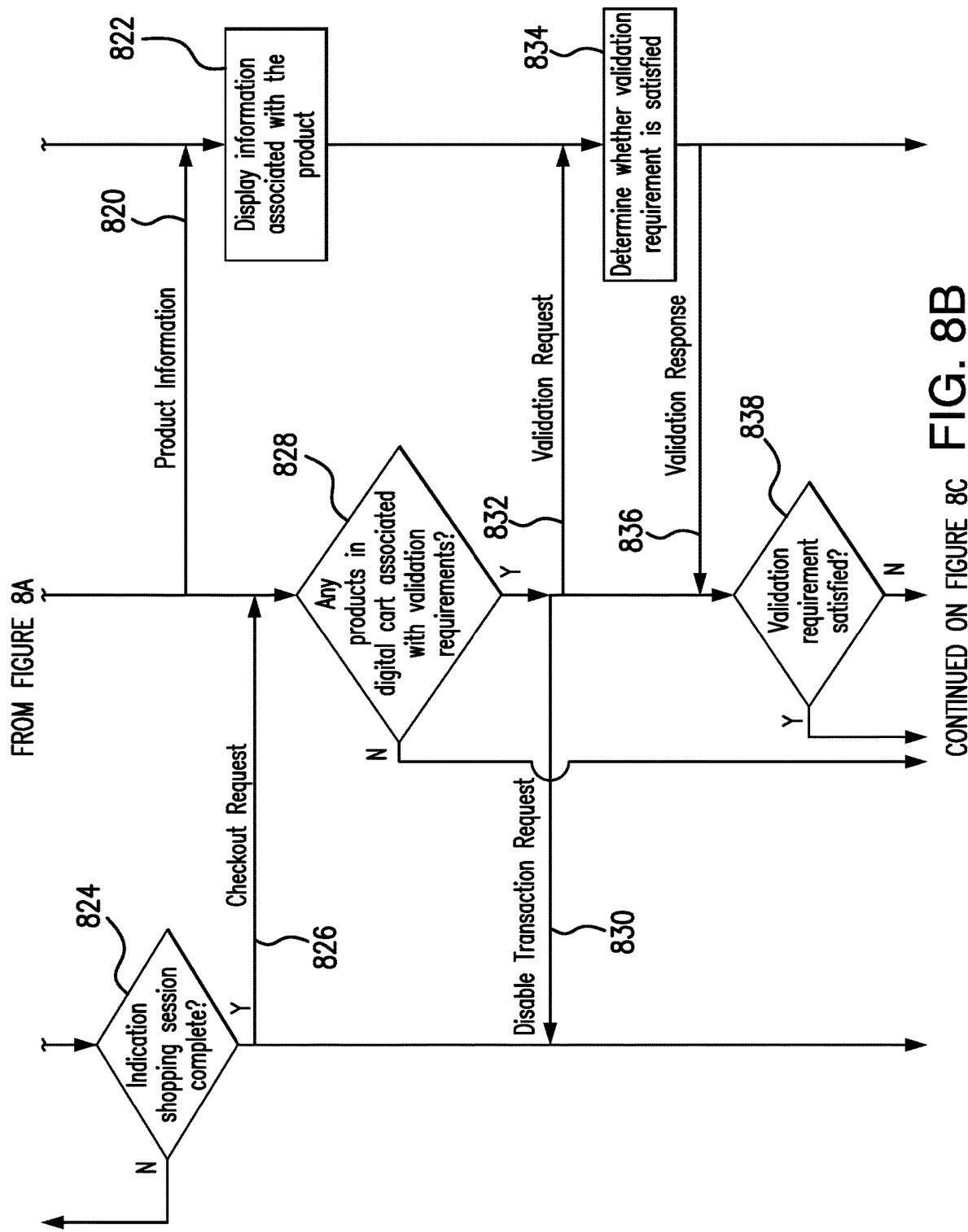
Figure 8C:
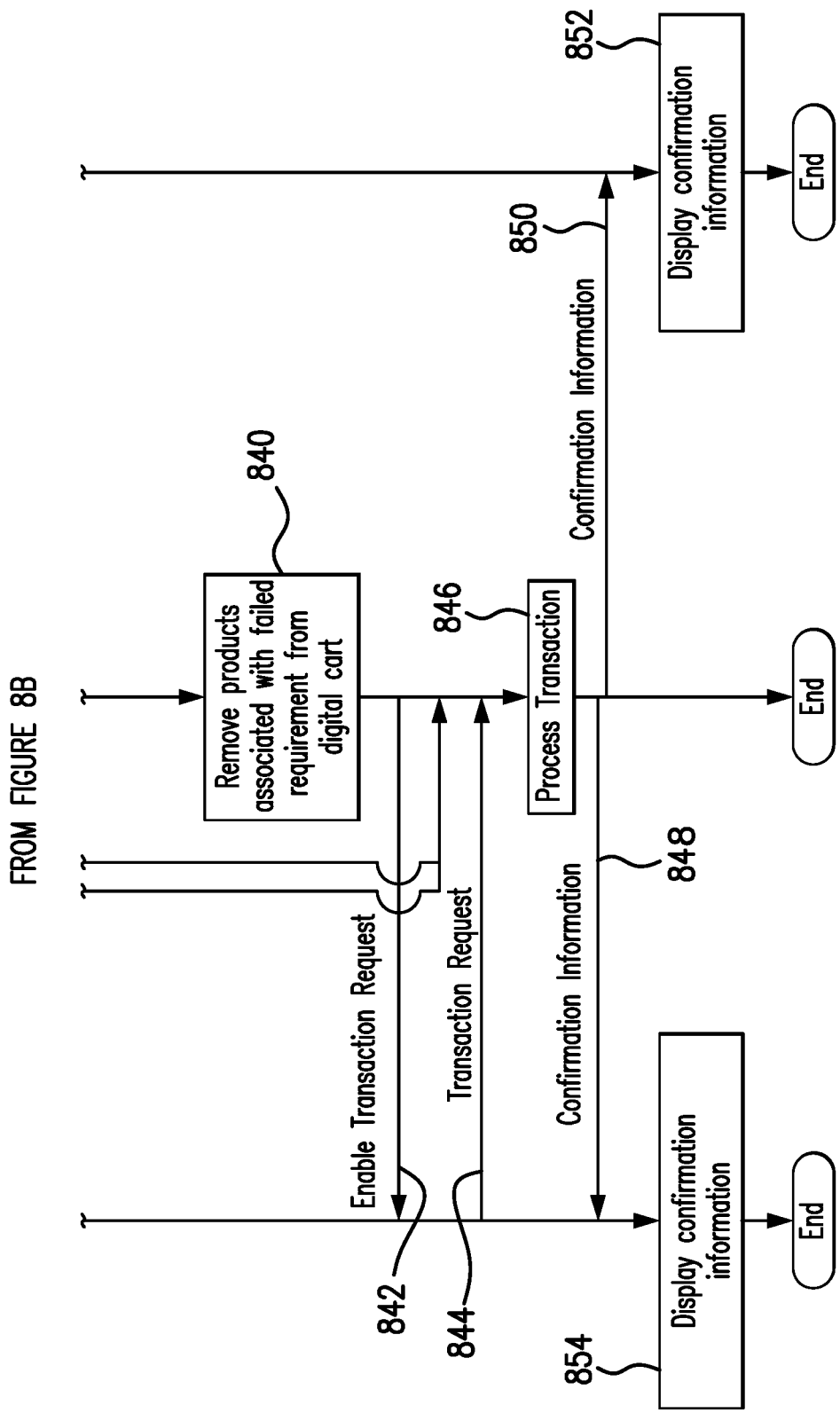

FIGS. 8A-8C present a flowchart illustrating the process by which mobile device 106, merchant device 114, and cloud server 132 cooperative through interprocess communication to monitor, validation, and process a mobile self-checkout transaction initiated by mobile device 106.

In step 802 mobile device 106 sends a request 145 to cloud server 132, to initiate the mobile self-checkout process. As an example, customer 104 may interact with mobile application 108, running on mobile device 106, to communicate with cloud server 132. For example, customer 104 may select a button of a graphical user interface displayed by mobile application 108 on mobile device 106, to indicate that customer 104 is ready to initiate the mobile self-checkout process. In certain embodiments, request 145 may include location information 152. For example, request 145 may include GPS information. In step 804 cloud server 132 determines whether mobile device 106 is within physical location 102. For example, cloud server may determine whether location information 152 is associated with a location within physical location 102 (e.g., within a boundary of locations defined by store location information 136).

If, in step 804, cloud server 132 determines that mobile device 106 is within physical location 102, in step 806 cloud server 132 transmits a message to mobile device 106, enabling mobile device 106 to engage in the mobile self-checkout process. For example, cloud server 132 may transmit a message to mobile device 106, instructing mobile application 108 to enable a feature which allows customer 104 to use mobile device 106 to enter product identification information 146 into mobile application 108.

In step 808 mobile device 106 selects a product 128 to add to digital cart 110. For example, customer 104 uses mobile device 106 to enter into mobile application 108 product identification 146 for a product 128 that customer 104 wishes to purchase. Product identification information may include an image, a barcode, a product name, a product description, price information, or any other suitable information for identifying a product 128. Customer 104 may use mobile device 106 to enter product identification information 146 into mobile application 108 in any suitable manner.

As an example, in certain embodiments, customer 104 may enter product identification information 146 into mobile application 108 by scanning product 128, using a camera of mobile device 106. Mobile device 106 may scan barcode 204, labels, or any portion of product 128.

In step 810 mobile device 106 sends product identification information 146 to cloud server 132. In step 812 cloud server 132 uses product identification information 146 to add product 128 to digital cart 110. For example, cloud server 132 may use product identification information 146 to identify product 128 by locating an entry for product 128 in product inventory 138. Cloud server 132 may generate an entry in digital cart 110 that includes a description of product 128, a quantity for product 128, a price for product 128, and/or any other suitable type of information for product 128. In step 812 cloud server 132 determines whether product 128 is the first product that mobile device 106 has added to digital cart 110. If, in step 812, cloud server 132 determines that product 128 is the first product that mobile device 106 has added to digital cart 110, in step 816 cloud server 132 transmits customer profile information 142 to merchant device 114. In step 818 merchant device displays transaction profile 120 on display 116. Transaction profile 120 is associated with a mobile self-checkout session conducted by customer 104. Transaction profile 120 includes customer profile information 142 (e.g., a name of customer 104) received by merchant device 114 and information associated with the digital cart 110 belonging to customer 104. In certain embodiments, in addition to or instead of transmitting customer profile information 42 to merchant device 114 in response to determining that mobile device 106 has added a first product 128 to digital cart 110, cloud server 132 may transmit customer profile information 142 to merchant device 114 in response to determining that mobile device 106 is within physical location 102.

In response to cloud server 132 adding a product 128 to digital cart 110, cloud server 132 may communicate digital cart 110 and/or information associated with digital cart 110 to mobile device 106. In step 820 cloud server 132 sends digital cart 110 and/or information about digital cart 110 to merchant device 114. In step 822 merchant device 114 displays information associated with product 128 on display 116. For example, merchant device 114 may display a description of product 128, a price of product 128, and/or any other information related to product 128 and/or digital cart 110. In certain embodiments, merchant device 114 displays information associated with product 128 on transaction profile 120. In some embodiments, merchant device 114 displays information associated with product 128 in response to merchant 112 interacting with merchant device 114 to select transaction profile 120.

In step 824 mobile device 106 determines whether customer 104 has finished adding products 128 to digital cart 110. For example, mobile device 106 may determine whether customer 104 has selected checkout button 404 displayed on mobile device 106 by mobile application 108. If, in step 824, mobile device 106 determines that customer 104 has not finished adding products 128 to digital cart 110, method 800 returns to step 812. If, in step 824, mobile device 106 determines that customer 104 has finished adding products 128 to digital cart 110, in step 826 mobile device 106 transmits a checkout request to cloud server 132. For example, mobile device 106 may transmit the checkout request in response to customer 104 selecting checkout button 404, displayed on mobile device 106 by mobile application 108. In step 828 cloud server 132 determines whether any of the products 128 in digital cart 110 are associated with a validation requirement 140. Validation requirement(s) 140 may be any suitable requirement(s) that product(s) 128 should satisfy in order for customer 104 to be permitted to purchase the product(s). As an example, a product 128 may be an age-restricted product and validation requirement 140 may be a requirement that customer 104 is of legal age to purchase the product. As another example, a product 128 may be a hot food item and validation requirement 140 may be a requirement that the item is currently available (e.g., that the item has been prepared and is ready for customer 104 to receive). As a further example, a product 128 may be associated with a random check (e.g., cloud server 132 may randomly select the product and/or the digital cart 110 containing the product) and validation requirement 140 may be a requirement that the physical products in customer 104's possession are only those that customer 104 has added to digital cart 110.

If, in step 828, cloud server 132 determines that one or more products 128 are associated with validation requirement(s) 140, in step 830 cloud server 132 transmits a message to mobile device 106, instructing mobile application 108 to prevent mobile device 106 from completing a transaction for products 128 stored in digital cart 110. In response to receiving this message, mobile application 108 may disable payment button 410, through which customer 104 would otherwise interact to submit transaction request 154. In step 832 cloud server 132 sends a validation request 148 to merchant device 114. Validation request 148 is a request for merchant device 114 to determine whether or not the one or more validation requirements 140 associated with products 128 in digital cart 110 are satisfied. In step 834 merchant device 114 determines whether the validation requirement(s) 140 are satisfied. Merchant device 114 may evaluate validation requirement(s) 140 in any suitable manner. As an example, in certain embodiments in which validation requirement 140 is an age verification requirement, merchant device 114 may evaluate validation requirement 140 by scanning an ID of customer 104, receiving a birthdate of customer 104 and determining the age of customer 104 from the birthdate, performing a biometric scan of customer 104, and/or performing any other suitable process. As another example, in certain embodiments in which validation requirement 140 is a requirement that a product in customer 104's digital cart 110 is currently available (e.g., the product is a hot food item that has been prepared and is ready for customer 104 to receive), merchant device 114 may evaluate validation requirement 140 by receiving an indication that the product is available or that the product is unavailable. As a further example, in certain embodiments in which validation requirement 140 is a requirement that the physical products in customer 104's possession are only those that customer 104 has added to digital cart 110, merchant device 114 may evaluate validation requirement 140 by scanning the physical products in customer 104's possession and comparing the scanned products to those in customer 104's digital cart 110, and/or receiving an indication of whether or not the physical products in customer 104's possession match those that customer 104 has added to digital cart 110. For example, merchant 112 may visually inspect the products 128 in customer 104's possession and then interact with merchant device 114 (e.g., interact with one or more buttons displayed on section 314 of page 312 displayed by merchant device 114) to input into merchant device 114 whether or not the physical products in customer 104's possession match those that customer 104 has added to his/her digital cart 110. In step 836 merchant device 114 sends validation response 150 to cloud server 132. Validation response 150 indicates whether or not the one or more validation requirements 140 are satisfied. In step 838 cloud server 132 uses validation response 150 to determine whether or not the one or more validation requirements 140 are satisfied. If all of the validation requirements 140 are satisfied, the method proceeds to step 844. If any of the validation requirements 140 are not satisfied, in step 840 cloud server 132 removes the products 128 associated with the failed validation requirements 140 from digital cart 110 and communicates the updated digital cart 110 to mobile device 106. In step 842 cloud server 132 transmits a message to mobile device 106, instructing mobile application 108 to enable mobile device 106 to complete a transaction for products 128 stored in digital cart 110. In response to receiving this message, mobile application 108 may enable payment button 410, through which customer 104 may interact to submit transaction request 154. The method then proceeds to step 844. If, in step 828, cloud server 132 determines that none of the products 128 in digital cart 110 are associated with a validation requirement 140, the method proceeds directly to step 844.

In step 844 mobile device 106 transmits transaction request 154 to cloud server 132. In certain embodiments, mobile device 106 transmits transaction request 154 to cloud server 132 in response to customer 104 selecting payment button 410, displayed by mobile application 108 on mobile device 106. In certain embodiments, transaction request 154 may include payment information for facilitating a transaction for the products 128 in digital cart 110. In some embodiments, transaction request 154 may grant cloud server 132 permission to access payment information stored by cloud server 132. In step 846 cloud server 132 processes the requested transaction. For example, cloud server 132 uses payment information received in transaction request 154 and/or stored by cloud server 132 to facilitate an electronic purchase of the products 128 in digital cart 110. In step 848 cloud server 132 transmits confirmation information 156 to mobile device 106. The confirmation information 156 may indicate that cloud server 132 successfully processed the transaction. Similarly, in step 850 cloud server 132 transmits confirmation information 156 to merchant device 114. In step 852 merchant device 114 displays the confirmation information 156 and/or information associated with the confirmation information 156 on display 116 of merchant device 114. For example, merchant device 114 may display an indication in profile 120 that the transaction was successfully processed. In step 854 mobile device 106 displays the confirmation information 156 and/or information associated with the confirmation information 156. For example, mobile application 108 may display an indication on mobile device 106 that the transaction was successfully processed.

In certain embodiments, the confirmation information 156 and/or information associated with the confirmation information 156 displayed by mobile device 106 includes a dynamic component. For example, in certain embodiments, mobile device 106 may display a pulsating number 702, corresponding to the total number of products 128 in customer 104's digital cart 110. Customer 104 may present the dynamic component to merchant 112 who may then determine that the transaction conducted by mobile device 106 is valid based on the presence of the dynamic component as well as the presence of an indication on profile 120, displayed on merchant device 114, that the transaction was successfully processed.

In certain embodiments in which system 100 includes validation terminal 122, method 100 may include additional steps. For example, in response to processing the transaction, cloud server 132 may transmit a barcode 158 to mobile device 106. Mobile device 106 may then display barcode 158 and use barcode 158 to interact with validation terminal 122. For example, customer 104 may place the display of mobile device 106 adjacent to a barcode reader 124 of validation terminal 158, to present barcode 158 to validation terminal 122. Validation terminal 122 may then read barcode 158 and determine whether barcode 158 is valid. Validation terminal 122 may determine whether barcode 158 is valid in any suitable manner. For example, validation terminal 122 may extract a timestamp from barcode 158 and determine whether the timestamp is within a predetermined time window. In response to determining that barcode 158 is invalid, validation terminal 122 indicates that the transaction is invalid. For example, validation terminal 122 may activate one or more red LEDs to indicate that the transaction is invalid. In response to determining that barcode 158 is valid, validation terminal 122 indicates that the transaction is valid. For example, validation terminal 122 may activate one or more green LEDs to indicate that the transaction is valid.

Modifications, additions, or omissions may be made to method 800 depicted in FIGS. 8A-8C. Method 800 may include more, fewer, or other steps. For example, steps may be performed in parallel or in any suitable order. While discussed as mobile device 106, cloud server 132, and merchant device 114 (or components thereof) performing the steps, any suitable component of system 100 may perform one or more steps of the method.

V. Example Devices for Implementing Components of the Validation System

Figure 9:
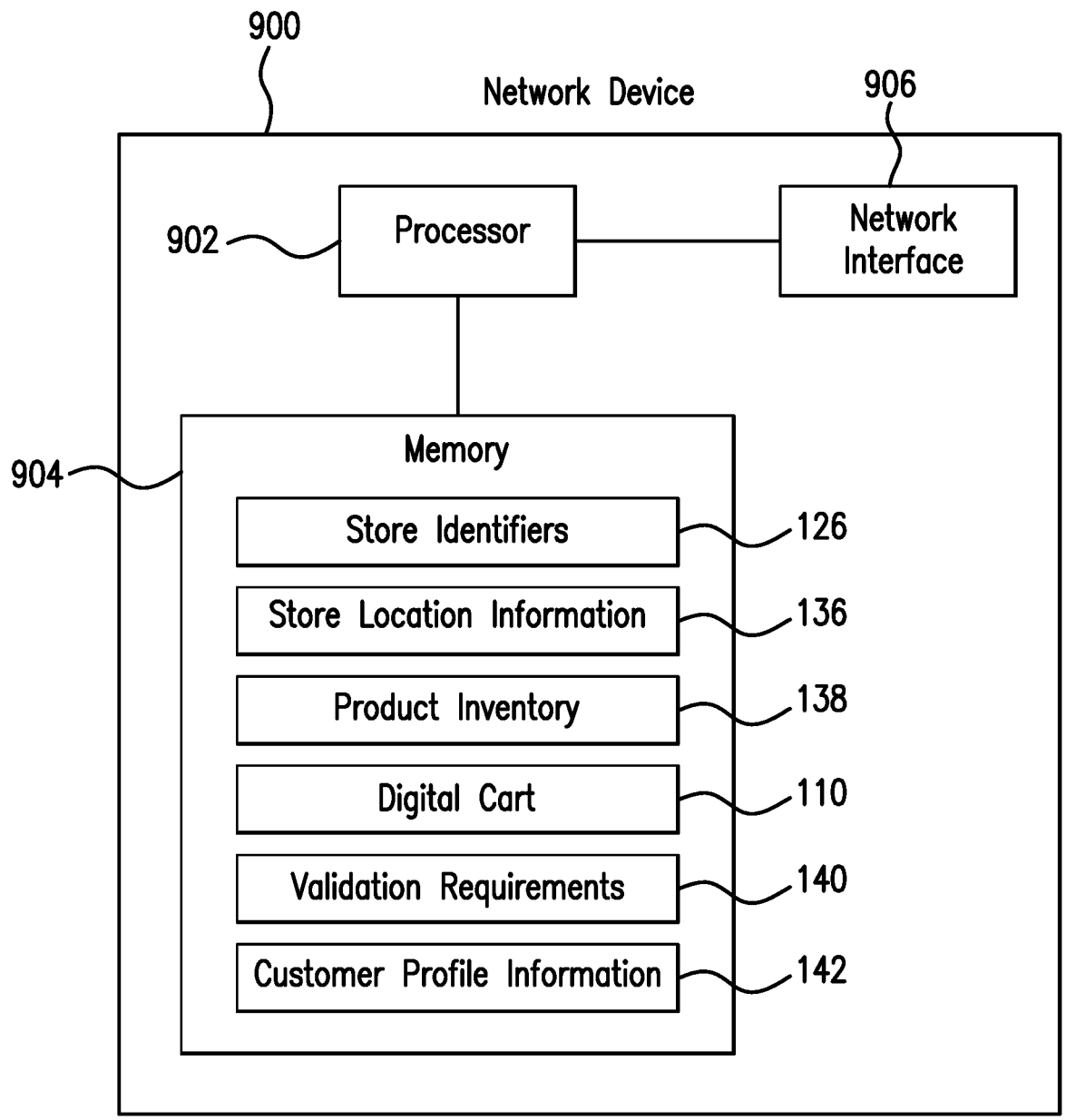
FIG. 9 illustrates an example device configured to implement one or more components of the example validation system of FIG. 1.

FIG. 9 illustrates an example device 900 configured to implement one or more components of validation system 100. For example, device 900 may be used to implement merchant device 114, validation terminal 122, and/or cloud server 132. As illustrated in FIG. 9, device 900 includes a processor 902, a memory 904, and a network interface 906. Device 900 may be configured as shown or in any other suitable configuration.

Processor 902 includes one or more processors operably coupled to memory 904. Processor 902 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). Processor 902 may be a programmable logic device, a microcontroller, a microprocessor, or any suitable combination of the preceding. Processor 902 is communicatively coupled to and in signal communication with memory 904 and network interface 906. The one or more processors are configured to process data and may be implemented in hardware or software. For example, processor 902 may be 8-bit, 16-bit, 32-bit, 64-bit or of any other suitable architecture. Processor 902 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of method 800. In an embodiment, the function described herein is implemented using logic units, FPGAs, ASICs, DSPs, or any other suitable hardware or electronic circuitry.

Memory 904 is operable to store data for implementing functions of merchant device 114, validation terminal 122, and/or cloud server 132. For example, memory 904 may store store identifiers 126, store location information 136, product inventory 138, digital cart 110, validation requirements 140, customer profile information 142, and/or any other data or instructions. The instructions may include any suitable set logic, rules, or code operable to execute the function described herein. Memory 904 includes one or more disks, tape drives, or solid-state drives, and may be used as an over-flow data storage device, to store programs when such programs are selected for execution, and to store instructions and data that are read during program execution. Memory 904 may be volatile or non-volatile and may comprise read-only memory (ROM), random-access memory (RAM), ternary content-addressable memory (TCAM), dynamic random-access memory (DRAM), and static random-access memory (SRAM).

Network interface 906 is configured to enable wired and/or wireless communications (e.g., via network 128). Network interface 906 is configured to communicate data between device 900 and other network devices, systems, or domain(s). For example, network interface 906 may comprise a WIFI interface, a local area network (LAN) interface, a wide area network (WAN) interface, a modem, a switch, or a router. Processor 902 is configured to send and receive data using network interface 906. Network interface 906 may be configured to use any suitable type of communication protocol as would be appreciated by one of ordinary skill in the art.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:
1. A system comprising:
a server comprising:
a first hardware processor configured to:
receive, from a mobile device, location information that indicates a Global Positioning System (GPS) location of the mobile device;
determine, based at least in part upon the location information, that the mobile device is entered into a geofence area associated with a physical location, wherein the geofence area is a virtual geographical boundary around the physical location;
in response to determining that the mobile device is entered into the geofence area:
enable inter-process communications among multiple devices comprising the server, the mobile device, a merchant device, and a validation terminal to cooperatively perform a particular task comprising processing a transaction;
instruct the mobile device to perform one or more operations based at least in part upon the transaction, such that:
if it is determined that the transaction is valid, the mobile device is enabled to complete the transaction; and
if it is determined that the transaction is invalid, the mobile device is prevented from completing the transaction;

receive product information for a first product scanned by a mobile device, the mobile device associated with a user account;
in response to receiving the product information for the first product:
transmit an identification of the user account to the merchant device; and
store the product information for the first product in a digital cart comprising product information for one or more products scanned by the mobile device;
receive a transaction request from the mobile device for the one or more products scanned by the mobile device;
in response to receiving the transaction request:
determine that the first product is associated with a validation requirement;
in response to determining that the first product is associated with the validation requirement:
transmit a validation request to the merchant device, the validation request associated with the validation requirement; and
receive, from the merchant device, an indication that the validation requirement is satisfied; and
in response to receiving the indication that the validation requirement is satisfied, process the transaction for the one or more products, based on the product information for the one or more products stored in the digital cart;
in response to processing the transaction, transmit, to the merchant device, an indication that the transaction is complete; and
in response to processing the transaction, generate a barcode and transmit the barcode to the mobile device;
the merchant device, in signal communication with the server, the merchant device comprising:
a display;
a second hardware processor configured to:
receive, from the server, the identification of the user account;
display the identification of the user account on the display;
receive, from the server, the validation request;
in response to receiving the validation request:
determine that the validation requirement is satisfied; and
transmit the indication that the validation requirement is satisfied to the server;
receive, from the server, the indication that the transaction is complete; and
in response to receiving the indication that the transaction is complete, display the indication that the transaction is complete on the display;
the validation terminal located at a registered location and in signal communication with the server, the validation terminal comprising:
a barcode reader; and
a third hardware processor configured to:
detect that the barcode reader scanned the barcode; and
in response to detecting that the barcode reader scanned the barcode, transmit to the merchant device, an indication that the transaction has been validated, wherein, in response to receiving the indication that the transaction has been validated,
the merchant device is further configured to display the indication that the transaction has been validated.

2. The system of claim 1, wherein:
the first processor is further configured to:
receive product information for a second product scanned by the mobile device;
in response to receiving the product information for the second product:
store the product information for the second product in the digital cart;
determine that the second product is associated with a second validation requirement;
in response to receiving the transaction request and in response to determining that the second product is associated with the second validation requirement:
transmit a second validation request to the merchant device;
receive, from the merchant device, an indication that the second validation requirement is not satisfied; and
in response to receiving the indication that the second validation requirement is not satisfied, remove the product information for the second product from the digital cart, prior to processing the transaction; and
the second processor is further configured to:
receive, from the server, the second validation request; and
in response to receiving the second validation request:
determine that the second validation requirement is not satisfied; and
transmit the indication that the second validation requirement is not satisfied to the server.

3. The system of claim 1, wherein the second hardware processor is further configured to, in response to receiving the validation request, display a notification of the validation request on the display.

4. The system of claim 1, wherein:
the validation requirement comprises a requirement that an age of a user of the mobile device is above a threshold; and
determining that the validation requirement is satisfied comprises:
receiving age information for the user of the mobile device; and
determining, based on the age information, that the age of the user of the mobile device is above the threshold.

5. The system of claim 1, where:
the validation requirement comprises a requirement that the first product is available at the registered location; and
determining that the validation requirement is satisfied comprises receiving an indication that the first product is available at the registered location.

6. The system of claim 1, wherein the second hardware processor is configured to:
receive, from the server, the product information for the one or more products stored in the digital cart; and
in response to receiving the product information for the one or more products stored in the digital cart, display the product information on the display.

7. A method comprises:
receiving, from a mobile device, location information that indicates a Global Positioning System (GPS) location of the mobile device;

determining, based at least in part upon the location information, that the mobile device is entered into a geofence area associated with a physical location, wherein the geofence area is a virtual geographical boundary around the physical location;

in response to determining that the mobile device is entered into the geofence area:
enabling inter-process communications among multiple devices comprising the server, the mobile device, a merchant device, and a validation terminal to cooperatively perform a particular task comprising processing a transaction;
instructing the mobile device to perform one or more operations based at least in part upon the transaction, such that:
if it is determined that the transaction is valid, the mobile device is enabled to complete the transaction; and
if it is determined that the transaction is invalid, the mobile device is prevented from completing the transaction;
receiving product information for a first product scanned by a mobile device, the mobile device associated with a user account;
in response to receiving the product information for the first product:
transmitting an identification of the user account to the merchant device;
storing the product information for the first product in a digital cart comprising product information for one or more products scanned by the mobile device;
receiving, by the merchant device, the identification of the user account; and
displaying, by the merchant device, the identification of the user account on a display;
receiving a transaction request from the mobile device for the one or more products scanned by the mobile device;
in response to receiving the transaction request:
determining that the first product is associated with a validation requirement;
in response to determining that the first product is associated with the validation requirement, transmitting a validation request to the merchant device, the validation request associated with the validation requirement;
in response to transmitting the validation request to the merchant device:
receiving, by the merchant device, the validation request;
determining, by the merchant device, that the validation requirement is satisfied; and
transmitting, by the merchant device, an indication that the validation requirement is satisfied;
in response to transmitting, by the merchant device, the indication that the validation requirement is satisfied:
receiving the indication that the validation requirement is satisfied; and
processing the transaction for the one or more products, based on the product information for the one or more products stored in the digital cart; and
in response to processing the transaction:
transmitting, to the merchant device, an indication that the transaction is complete;
receiving, by the merchant device, the indication that the transaction is complete; and
in response to receiving the indication that the transaction is complete, displaying, by the merchant device, the indication that the transaction is complete on the display;
in response to processing the transaction:
generating a barcode; and
transmitting the barcode to the mobile device;
detecting, by the validation terminal located at a registered location, that a barcode reader scanned the barcode;
in response to detecting that the barcode reader scanned the barcode, transmitting, by the validation terminal to the merchant device, an indication that the transaction has been validated; and
in response to receiving the indication that the transaction has been validated, displaying, by the merchant device, the indication that the transaction has been validated.

8. The method of claim 7, further comprising:
receiving product information for a second product scanned by the mobile device;
in response to receiving the product information for the second product:
storing the product information for the second product in the digital cart;
determining that the second product is associated with a second validation requirement;
in response to receiving the transaction request and in response to determining that the second product is associated with the second validation requirement, transmitting a second validation request to the merchant device;
in response to transmitting the second validation request to the merchant device:
receiving, by the merchant device, the second validation request;
determining, by the merchant device, that the second validation requirement is not satisfied; and
transmitting, by the merchant device, an indication that the second validation requirement is not satisfied;
in response to transmitting, by the merchant device, the indication that the second validation requirement is not satisfied:
receiving the indication that the second validation requirement is not satisfied; and
removing the product information for the second product from the digital cart, prior to processing the transaction.

9. The method of claim 7, further comprising, in response to receiving, by the merchant device, the validation request, displaying, by the merchant device, a notification of the validation request on the display.

10. The method of claim 7, wherein:
the validation requirement comprises a requirement that an age of a user of the mobile device is above a threshold; and
determining that the validation requirement is satisfied comprises:
receiving age information for the user of the mobile device; and
determining, based on the age information, that the age of the user of the mobile device is above the threshold.

11. The method of claim 7, where:
the validation requirement comprises a requirement that the first product is available at the registered location; and
determining that the validation requirement is satisfied comprises receiving an indication that the first product is available at the registered location.

12. The method of claim 7, further comprising:
receiving, by the merchant device, the product information for the one or more products stored in the digital cart; and
in response to receiving the product information for the one or more products stored in the digital cart, displaying, by the merchant device, the product information on the display.

13. A non-transitory computer-readable medium comprising instructions that are configured, when executed by a hardware processor, to:
receive, from a mobile device, location information that indicates a Global Positioning System (GPS) location of the mobile device;
determine, based at least in part upon the location information, that the mobile device is entered into a geofence area associated with a physical location, wherein the geofence area is a virtual geographical boundary around the physical location;
in response to determining that the mobile device is entered into the geofence area:
enable inter-process communications among multiple devices comprising the server, the mobile device, a merchant device, and a validation terminal to cooperatively perform a particular task comprising processing a transaction;
instruct the mobile device to perform one or more operations based at least in part upon the transaction, such that:
if it is determined that the transaction is valid, the mobile device is enabled to complete the transaction; and
if it is determined that the transaction is invalid, the mobile device is prevented from completing the transaction;
receive product information for a first product scanned by a mobile device, the mobile device associated with a user account;
in response to receiving the product information for the first product:
transmit an identification of the user account to the merchant device, wherein the merchant device is configured to:
receive the identification of the user account; and
display the identification of the user account on a display; and
store the product information for the first product in a digital cart comprising product information for one or more products scanned by the mobile device;
receive a transaction request from the mobile device for the one or more products scanned by the mobile device;
in response to receiving the transaction request:
determine that the first product is associated with a validation requirement;
in response to determining that the first product is associated with the validation requirement:
transmit a validation request to the merchant device, the validation request associated with the validation requirement, wherein the merchant device is further configured to:
receive the validation request; and
in response to receiving the validation request:
determine that the validation requirement is satisfied; and
transmit the indication that the validation requirement is satisfied; and
receive, from the merchant device, an indication that the validation requirement is satisfied; and
in response to receiving the indication that the validation requirement is satisfied, process the transaction for the one or more products, based on the product information for the one or more products stored in the digital cart; and
in response to processing the transaction, transmit, to the merchant device, an indication that the transaction is complete, wherein the merchant device is further configured to:
receive the indication that the transaction is complete; and
in response to receiving the indication that the transaction is complete, display the indication that the transaction is complete on the display;
in response to processing the transaction:
generating a barcode; and
transmitting the barcode to the mobile device;
detecting, by the validation terminal located at a registered location, that a barcode reader scanned the barcode;
in response to detecting that the barcode reader scanned the barcode, transmitting, by the validation terminal to the merchant device, an indication that the transaction has been validated; and
in response to receiving the indication that the transaction has been validated, displaying, by the merchant device, the indication that the transaction has been validated.

14. The non-transitory computer-readable medium of claim 13, wherein the first instructions are further configured, when executed by the first hardware processor, to:
receive product information for a second product scanned by the mobile device;
in response to receiving the product information for the second product:
store the product information for the second product in the digital cart;
determine that the second product is associated with a second validation requirement;
in response to receiving the transaction request and in response to determining that the second product is associated with the second validation requirement:
transmit a second validation request to the merchant device, wherein the merchant device is further configured to:
receive the second validation request; and
in response to receiving the second validation request:
determine that the second validation requirement is not satisfied; and
transmit the indication that the second validation requirement is not satisfied;
receive, from the merchant device, an indication that the second validation requirement is not satisfied; and
in response to receiving the indication that the second validation requirement is not satisfied, remove the product information for the second product from the digital cart, prior to processing the transaction.

15. The non-transitory computer-readable medium of claim 13, wherein the merchant device is further configured to, in response to receiving the validation request, display a notification of the validation request on the display.

16. The non-transitory computer-readable medium of claim 13, wherein:
   the validation requirement comprises a requirement that an age of a user of the mobile device is above a threshold; and
   determining that the validation requirement is satisfied comprises:
      receiving age information for the user of the mobile device; and
      determining, based on the age information, that the age of the user of the mobile device is above the threshold.

17. The non-transitory computer-readable medium of claim 13, where:
   the validation requirement comprises a requirement that the first product is available at the registered location; and
   determining that the validation requirement is satisfied comprises receiving an indication that the first product is available at the registered location.

18. The non-transitory computer-readable medium of claim 13, wherein the merchant device is further configured to:
   receive the product information for the one or more products stored in the digital cart; and
   in response to receiving the product information for the one or more products stored in the digital cart, display the product information on the display.

* * * * *